(12) United States Patent
Niioka et al.

(10) Patent No.: US 8,368,861 B2
(45) Date of Patent: Feb. 5, 2013

(54) LIQUID CRYSTAL DISPLAY DEVICE COMPRISING PERIODICALLY CHANGED PERMUTATIONS OF AT LEAST TWO TYPES OF ELECTRODE-PATTERN PAIRS

(75) Inventors: Shinya Niioka, Kanagawa (JP); Ken Sumiyoshi, Nakahara-ku (JP)

(73) Assignee: NLT Technologies, Ltd., Kanagawa (JP)

( * ) Notice: Subject to any disclaimer, the term of this patent is extended or adjusted under 35 U.S.C. 154(b) by 851 days.

(21) Appl. No.: 12/238,230

(22) Filed: Sep. 25, 2008

(65) Prior Publication Data

US 2009/0079919 A1    Mar. 26, 2009

(30) Foreign Application Priority Data

Sep. 26, 2007   (JP) ................ 2007-249281

(51) Int. Cl.
*G02F 1/1335*   (2006.01)
*G02F 1/1343*   (2006.01)

(52) U.S. Cl. ........................ 349/141; 349/114
(58) Field of Classification Search ............ 349/113, 349/114, 141
See application file for complete search history.

(56) References Cited

U.S. PATENT DOCUMENTS

| | | | |
|---|---|---|---|
| 6,525,798 B1 * | 2/2003 | Yamakita et al. | 349/141 |
| 7,403,255 B2 * | 7/2008 | Ono et al. | 349/141 |
| 2006/0139544 A1 | 6/2006 | Ko et al. | |
| 2006/0203169 A1 * | 9/2006 | Ozawa et al. | 349/141 |
| 2007/0002226 A1 | 1/2007 | Sakamoto et al. | |
| 2007/0064181 A1 * | 3/2007 | Maeda et al. | 349/113 |

FOREIGN PATENT DOCUMENTS

| | | |
|---|---|---|
| JP | 10-62802 A | 3/1989 |
| JP | 11-38441 A | 5/1989 |
| JP | 2622762 B2 | 8/1991 |
| JP | 2955277 B2 | 4/1999 |
| JP | 2001-337339 A | 12/2001 |
| JP | 2002-214644 A | 7/2002 |
| JP | 2003-344837 A | 12/2003 |
| JP | 2004-069827 A | 3/2004 |
| JP | 2005-338256 A | 12/2005 |
| JP | 2007-058007 A | 3/2007 |

OTHER PUBLICATIONS

Oobayashi Seiko KK, Liquid Crystal Display Device, Mar. 6, 1998, Machine Translation of JP 10-062802 from Patent Abstracts of Japan Website, pp. 1-47.*
Chinese Office Action issued Apr. 23, 2012 in corresponding Chinese Patent Application No. 200810161055.5.
Japanese Office Action issued May 22, 2012 in corresponding Japanese Patent Application No. 2007-249281.
Communication dated Apr. 23, 2012 issued by The State Intellectual Property Office of the People's Republic of China in Corresponding Chinese Application No. 200810161055.5.

* cited by examiner

*Primary Examiner* — Mark Robinson
*Assistant Examiner* — Dennis Y Kim
(74) *Attorney, Agent, or Firm* — Sughrue Mion, PLLC

(57) ABSTRACT

A liquid crystal display device comprises a plurality of pixels arrayed in a first direction and a second direction, each of the pixels having a reflective area in at least a portion thereof. The reflective area comprises a surface-irregularity film that is a film having a plurality of surface irregularities, a light reflecting film disposed as an upper layer over the surface-irregularity film, and an electrode group disposed as an upper layer over the light reflecting film. The electrode group in each of the pixels that are arrayed in at least the first direction comprises at least two types of electrode patterns having different layouts.

8 Claims, 17 Drawing Sheets

Fig. 21
(a)
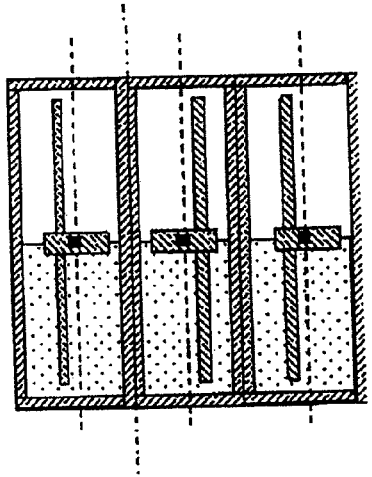
(b)
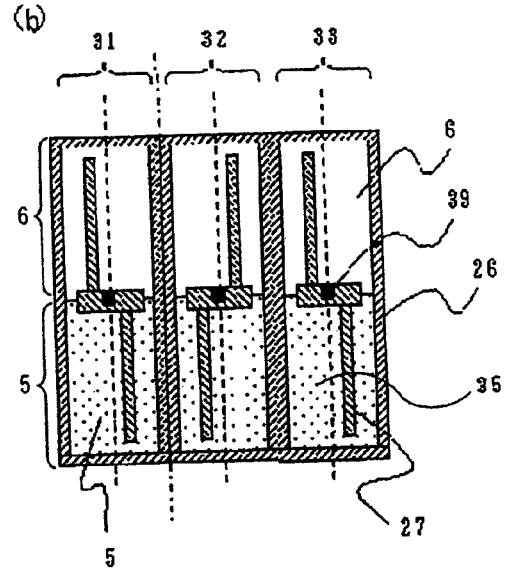
(c)
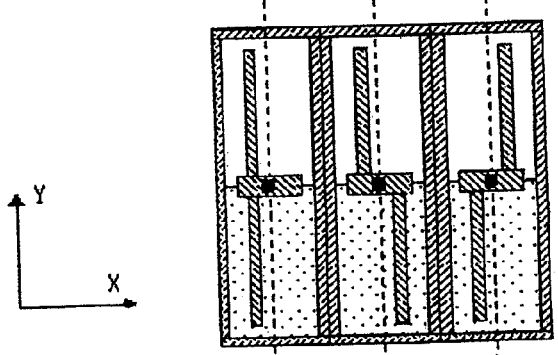
Fig. 22
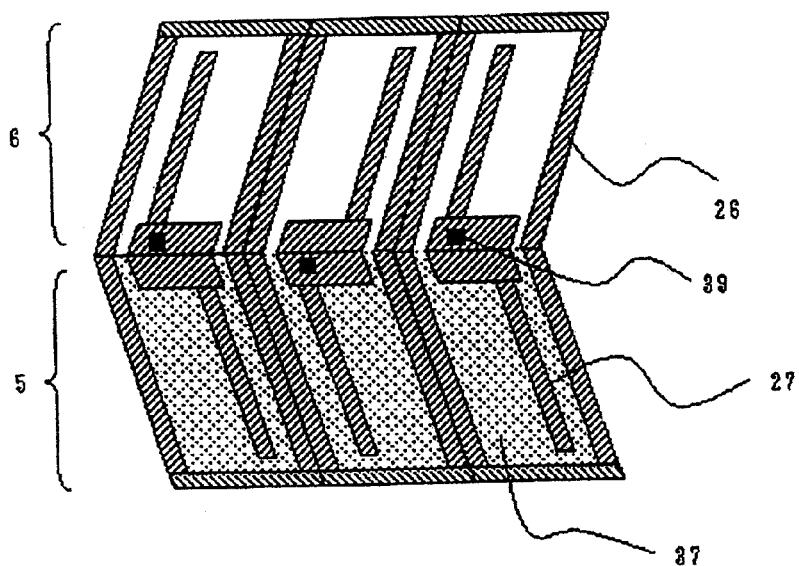

LIQUID CRYSTAL DISPLAY DEVICE COMPRISING PERIODICALLY CHANGED PERMUTATIONS OF AT LEAST TWO TYPES OF ELECTRODE-PATTERN PAIRS

This application is based upon and claims the benefit of priority from Japanese patent application No. 2007-249281, filed on Sep. 26, 2007, the disclosure of which is incorporated herein in its entirety by reference.

BACKGROUND OF THE INVENTION

1. Field of the Invention

The present invention relates to a semitransmissive or reflective electrooptical device having substrates with an electrooptical material held thereby, and an electronic device incorporating such a semitransmissive or reflective electrooptical device. In particular, the present invention is concerned with an IPS (In Plane Switching)-mode active-matrix liquid crystal display device.

The term "semitransmissive liquid crystal display device" referred to herein means a display device having a reflective display area for reflecting incident light from an external source to display an image and a transmissive display area for transmitting light from a light source disposed behind to display an image.

2. Description of the Related Art

At present, semitransmissive liquid crystal display devices of the IPS type or the VA (Vertical Alignment) type having a wide angle of view have been in widespread use as monitors, and have also been used as television display devices that have increased response characteristics. Liquid crystal display devices are also used on portable information-oriented devices such as cellular phones and digital cameras.

Portable information-oriented devices are mainly used by individuals. Recently, a growing number of portable information-oriented display devices incorporate angularly variable display panels, and should desirably have a wide viewing angle as they are often viewed obliquely. Since display devices for use in portable information-oriented devices are used in a variety of environments ranging from outdoors in sunlight to dark rooms, it is desirable for them to be semitransmissive. Semitransmissive liquid crystal display devices have a reflective display area and a transmissive display area in each pixel.

Heretofore, there have been known a reflective liquid crystal display device wherein a reflective plate reflects incident light from outside the device to provide a display light source, so that the device does not need to have a backlight as a light source, and a transmissive liquid crystal display device having a backlight as a light source.

Since the reflective liquid crystal display device does not require a backlight which is a dispensable component of the transmissive liquid crystal display device, the reflective liquid crystal display device has a low power requirement, a low profile, and a low weight, and is mainly used in portable terminals. The transmissive liquid crystal display device has good visibility even if the ambient light is low since it has a backlight light source.

Japanese patent No. 2955277 (hereinafter referred to as Patent document 1) has proposed a semitransmissive liquid crystal display device having both a reflective area and a transmissive area in each pixel, as a liquid crystal display device that has the advantages of both the reflective liquid crystal display device and the transmissive liquid crystal display device.

The reflective display area reflects incident light from the surrounding area with a reflecting plate to display an image and has a constant contrast ratio irrespective of the surrounding brightness. Therefore, the reflective display area can display good images in relatively bright environments ranging from outdoors in sunlight to rooms. The transmissive display area employs a backlight and has a constant luminance level regardless of the environment. Therefore, the transmissive display area can display images at a high contrast ratio in relatively dark environments ranging from indoors to dark rooms. The semitransmissive liquid crystal display device which has both a reflective display area and a transmissive display area is capable of displaying images at a high contrast ratio in a wide variety of environments ranging from outdoors in sunlight to dark rooms.

The semitransmissive liquid crystal display device has a reflective area and a transmissive area in each pixel electrode. When the ambient light is bright, the backlight is turned off to use the semitransmissive liquid crystal display device as a reflective liquid crystal display device. At this time, the semitransmissive liquid crystal display device has a low power requirement which is a property of the reflective liquid crystal display device. When the ambient light is dark, the backlight is turned on to use the semitransmissive liquid crystal display device as a transmissive liquid crystal display device. At this time, the semitransmissive liquid crystal display device has increased visibility in the surrounding dark which is a property of the transmissive liquid crystal display device.

Liquid crystal display devices are classified into a vertical-electric-field liquid crystal display device in which the molecular axes (referred to as "directors") of oriented liquid crystal molecules are rotated in a plane perpendicular to the substrate to display an image, and a horizontal-electric-field liquid crystal display device in which the molecular axes are rotated in a plane parallel to the substrate to display an image. Generally, the vertical-electric-field liquid crystal display device has poorer viewing angle characteristics than the horizontal-electric-field liquid crystal display device. It has been expected that a reflective display mode and a transmissive display mode having a wide viewing angle can be simultaneously achieved by applying a horizontal-electric-field drive scheme, such as an IPS system that has been known for having a transmissive display with a wide viewing angle, to a semitransmissive liquid crystal display device.

One example of such an attempt is disclosed as a semitransmissive IPS system in JP-A No. 2005-338256 (hereinafter referred to as Patent document 2). In recent years, there has been proposed a system wherein the horizontal-electric-field principle is applied to both a reflective area and a transmissive area, as disclosed in JP-A No. 2003-344837 (hereinafter referred to as Patent document 3). The technology disclosed in Patent document 3, which is an example according to the related art in which the horizontal-electric-field principle is applied to both a reflective area and a transmissive area, will be described below with reference to FIG. 1 of the accompanying drawings.

FIG. 1 is a cross-sectional view of a semitransmissive liquid crystal display device in which the horizontal-electric-field principle is applied to both a reflective area and a transmissive area. The semitransmissive liquid crystal display device comprises lower substrate 11, opposite substrate 12, liquid crystal layer 13 sandwiched between substrates 11, 12, and backlight 40 disposed below lower substrate 11. First insulating film 8a is disposed on the surface of lower substrate 11 which faces liquid crystal layer 13.

The semitransmissive liquid crystal display device includes reflective area 5 and transmissive area 6. In reflective area 5, second insulating film 8b is disposed on first insulating film 8a, and reflecting plate 9 is disposed on second insulating film 8b. Third insulating film 8c is disposed on reflecting plate 9, and horizontal-electric-field electrode 7 is disposed on third insulating film 8c. In transmissive area 6, horizontal-electric-field electrode 7 is disposed on first insulating film 8a.

Reflecting plate 9 is made of metal deposited on second insulating film 8b which has surface irregularities. Reflecting plate 9 reflects incident light diffusely. Third insulating film 8c is disposed on reflecting plate 9 to make the surface of the assembly smooth. In reflective area 5, horizontal-electric-field electrode 7 comprises common electrode 26 and pixel electrode 27, made of ITO, disposed on third insulating film 8c. In transmissive area 6, horizontal-electric-field electrode 7 comprises common electrode 26 and pixel electrode 27, made of ITO, disposed on first insulating film 8a.

Common electrode 26 and pixel electrode 27 of horizontal-electric-field electrode 7 extend parallel to each other. The liquid crystal molecules of liquid crystal layer 13 are driven by an electric field generated between pixel electrode 27 and common electrode 26. The structure disclosed in Patent document 3 thus simultaneously achieves a reflective display mode and a transmissive display mode with a wide viewing angle.

JP-A No. 2001-337339 (hereinafter referred to as Patent document 4) proposes a liquid crystal display device having a combination of electrode pairs that have different widths and intervals of a pixel electrode layer and a common electrode layer in each pixel. The proposed liquid crystal display device cancels out colorations generated in the respective areas to display images of excellent quality which suffer less colorations due to changes in the viewing direction. A coloration refers to the phenomenon in which the color of a displayed image is seen as blue or red depending on the viewing direction.

FIGS. 2(*a*) and 2(*b*) of the accompanying drawings are views showing the pixel structure of the liquid crystal display device disclosed in Patent document 4. FIG. 2(*a*) is a cross-sectional view of a pixel, and FIG. 2(*b*) is a plan view of the pixel.

The liquid crystal display device disclosed in Patent document 4 comprises a plurality of pixels each having a common electrode, a plurality of pixel electrodes, and a semiconductor switch device, scanning signal lines, video signal lines for outputting signals to the pixel electrodes. The liquid crystal display device also includes an array substrate that supports the pixels, the scanning signal lines, and the video signal lines on its surface; an opposite substrate disposed in facing relation to the array substrate; and a liquid crystal layer sandwiched between the array substrate and the opposite substrate.

A plurality of electrode pairs, each comprising a common electrode and a pixel electrode, are disposed in each of the pixels, and at least one of the electrode pairs is different in shape from another electrode pair. A certain electrode pair and another electrode pair have differently shaped electrodes which have the same function.

According to the liquid crystal display device disclosed in Patent document 4, one pixel includes a local region in which the shape of an electrode pair is different from the shape of another electrode pair for thereby producing a plurality of different distributions of electric fields. Therefore, the pixel includes a plurality of areas in which the directors of liquid crystal molecules are different from each other. Colorations in those areas cancel out each other to allow the liquid crystal display device to have a wide viewing angle.

Problems of the liquid crystal display devices according to the related art will be described below.

The semitransmissive liquid crystal display device disclosed in Patent document 3 causes a moiré pattern due to the periodic nature of the surface irregularity pattern of the reflecting plate and the electrode pattern, and causes a diffraction (iridescent light) due to light reflected from the electrodes or the reflecting plate.

The reflecting plate in the reflective display area is generally designed to have surface irregularities on the reflecting surface thereof. The minimum distance between the convexities of the surface irregularities is reduced as much as possible in order to scatter more light.

One approach to reduce a moiré pattern and iridescent light would be to randomize surface irregularities of a reflecting film beyond one pixel. Though it is ideal to randomize such surface irregularities, since the surface irregularities need to cover the surface uniformly two-dimensionally for uniformizing the reflected light, it is difficult to eliminate the periodicity of the surface irregularities completely. Therefore, the surface irregularities as they are observed macroscopically have a certain periodic nature which diffracts the reflected light.

In addition, it requires a large expenditure of labor and cost to randomize a mask pattern for a photomask in order to expose a photosensitive organic film. It is not practical to randomize the surface irregularities of the reflecting film unlimitedly beyond one pixel.

The inventor of the present invention has attempted to apply the technology disclosed in Patent document 4 to the pixel structure disclosed in Patent document 3 for reducing the periodicity of the pixel electrodes in one pixel. The term "periodicity" refers to the periodicity of the patterns of the pixel electrodes and the common electrode according to the horizontal-electric-field liquid crystal display device, for example.

However, even if the technology disclosed in Patent document 4 is applied to the pixel structure disclosed in Patent document 3, a moiré pattern is produced, lowering the quality of the displayed image, for the following reasons:

Even if the periodicity of the pixel electrodes in one pixel is eliminated based on the technologies disclosed in Patent document 3 and Patent document 4, since the display device is made of a matrix of pixels, the pixel electrodes are arrayed at the same pitch as the periodic pattern of the pixels. As a result, the display device produces a moiré pattern due to the periodicity of the pixel electrodes and the periodicity of the surface irregularities of the reflecting plate.

If the reflectance of the reflecting plate and the reflectance of the electrodes are different from each other, then since incident light from an external source is diffracted by the electrodes to generate interference fringes and iridescent light, the quality of the displayed images is greatly lowered. Particularly, the pixels disclosed in Patent document 4 are difficult to design for use as pixels for displaying high-definition images because the number of pixel electrodes that are disposed in one pixel is limited.

According to the above liquid crystal display device structure, the surface irregularities of the reflecting plate are arranged in a two-dimensional pattern, and the electrodes are arranged in a one-dimensional pattern. If a two-dimensionally periodic lattice and a one-dimensionally periodic lattice are superposed one on the other, then the combined lattices generate a moiré pattern. Japanese patent No. 2622762 (hereinafter referred to as Patent document 5) discloses a display device for reducing such a moiré pattern.

The display device disclosed in Patent document 5 comprises an image display unit having a plurality of pixels arranged periodically in a two-dimensional pattern and a light control film disposed on the display surface of the image display unit and including a striped pattern of light-permeable stripes and light-impermeable stripes that are alternately arranged at a predetermined pitch for controlling light passing through the light control film.

FIG. 3 of the accompanying drawings is a plan view showing the layout of the light control film with respect to the display surface of the image display unit disclosed in Patent document 5. FIG. 4 of the accompanying drawings is a graph showing the relationship between the angle β formed between the raster scan on the display surface and the stripes of the light control film, and the pitch p of the moiré pattern.

As shown in FIG. 3, the moiré pattern with pitch p is generated by the crossings of the raster scan (straight lines A) and the stripes (straight lines B) which are observed when the image display unit and the light control film are viewed head-on. If the angle β formed between the raster scan and the stripes of the light control film is relatively small, then pitch p of the moiré pattern can be calculated according to the following equation (1):

$$p = |a \cdot k/\cos \beta|/SQRT((\tan \beta)2 + (1 - k/\cos \beta)2) \quad (1)$$

FIG. 4 shows by way of example pitch p of the moiré pattern calculated when β is a variable and k is a parameter in the above equation (1). A review of FIG. 4 indicates that regardless of the magnitude of k, pitch p of the moiré pattern decreases as the angle β increases. If pitch p of the moiré pattern is equal to or smaller than the pitch of the raster scan, then the user is ignorant of the moiré pattern. The angle β for pitch p that is equal to or smaller than the pitch of the raster scan is about β≧3°.

The inventor applied the structure disclosed in Patent document 5 to the pixel structure of the display device disclosed in Patent document 3.

However, the displayed image suffered a moiré pattern and had a reduced quality for the reasons described below.

As described above, the distance between the convexities that are closest to each other on the reflecting plate is designed to be as small as possible to cause the reflecting plate to scatter and reflect light efficiently no matter the direction to which external light may be applied. The coordinates at which the convexities are located should ideally be placed at random.

However, if the surface irregularities of the reflecting plate are arranged to cover the surface uniformly two-dimensionally for uniformizing the reflected light, they produce a somewhat periodic structure.

Consequently, in order to reduce a moiré pattern caused by periodic surface irregularities arrayed in a first direction, periodic electrodes may be arrayed in a direction different from the first direction, but a moiré pattern is also produced due to periodic surface irregularities arrayed in a second direction. In other words, the moiré pattern may not necessarily be reduced if the periodic array of the electrodes is rotated over the two-dimensional matrix of surface irregularities.

In addition, if the periodic electrodes are arrayed in a direction different from the direction of the array of periodic surface irregularities, then since the layout of the electric is greatly restricted, the aperture ratio of the pixels (the ratio of an area for reflecting light, which is exclusive of the wiring, to an area representing the entire pixel) will be reduced.

If the distance between adjacent electrodes and the distance between closest convexities are about the same as each other, then the moiré pattern cannot be controlled even by increasing the angle between the direction of the array of periodic electrodes and the direction of the array of periodic surface irregularities.

Moreover, if the electrodes are arranged with the above angle being increased, the proportion of the pixel aperture is reduced, resulting in a reduction in the performance of the display device. Particularly with respect to high-definition display devices, since the size of pixels is small, the number of electrodes and reflecting surface irregularities that can be placed in a pixel are limited, tending to make the electrode pitch and the surface irregularity pitch substantially equal to each other.

SUMMARY OF THE INVENTION

It is an object of the present invention to provide a liquid crystal display device which will solve the above problems of the related art.

An exemplary object of the present invention is to provide a liquid crystal display device which is capable of effectively preventing a moiré pattern from being produced due to the periods between an irregularity pattern on a reflecting plate surface and an electrode pattern in a pixel and also of effectively preventing the interference of light (iridescent light) reflected from a reflecting plate or electrodes in a reflective area.

A liquid crystal display device according to an aspect of the present invention comprises a plurality of pixels arrayed in a first direction and a second direction, each of the pixels having a reflective area in at least a portion thereof.

The reflective area comprises a surface-irregularity film with a plurality of surface irregularities, a light reflecting film disposed as an upper layer over the surface-irregularity film, and an electrode group disposed as an upper layer over the light reflecting film.

The electrode group in each of the pixels comprises at least two types of electrode patterns. The pixels arrayed in at least the first direction have the at least two types of electrode patterns. The liquid crystal display device thus constructed solves the problems of the related art.

The above and other objects, features and advantages of the present invention will become apparent from the following description with reference to the accompanying drawings which illustrate examples of the present invention.

BRIEF DESCRIPTION OF THE DRAWINGS

FIGS. 21(*a*) through 21(*c*) are plan views showing pixels of a liquid crystal display device according to a second aspect of the third exemplary embodiment of the present invention;

FIG. 22 is a plan view showing a pixel of a liquid crystal display device according to a third aspect of the third exemplary embodiment of the present invention;

DETAILED DESCRIPTION OF THE EXEMPLARY EMBODIMENTS

Figure 1:
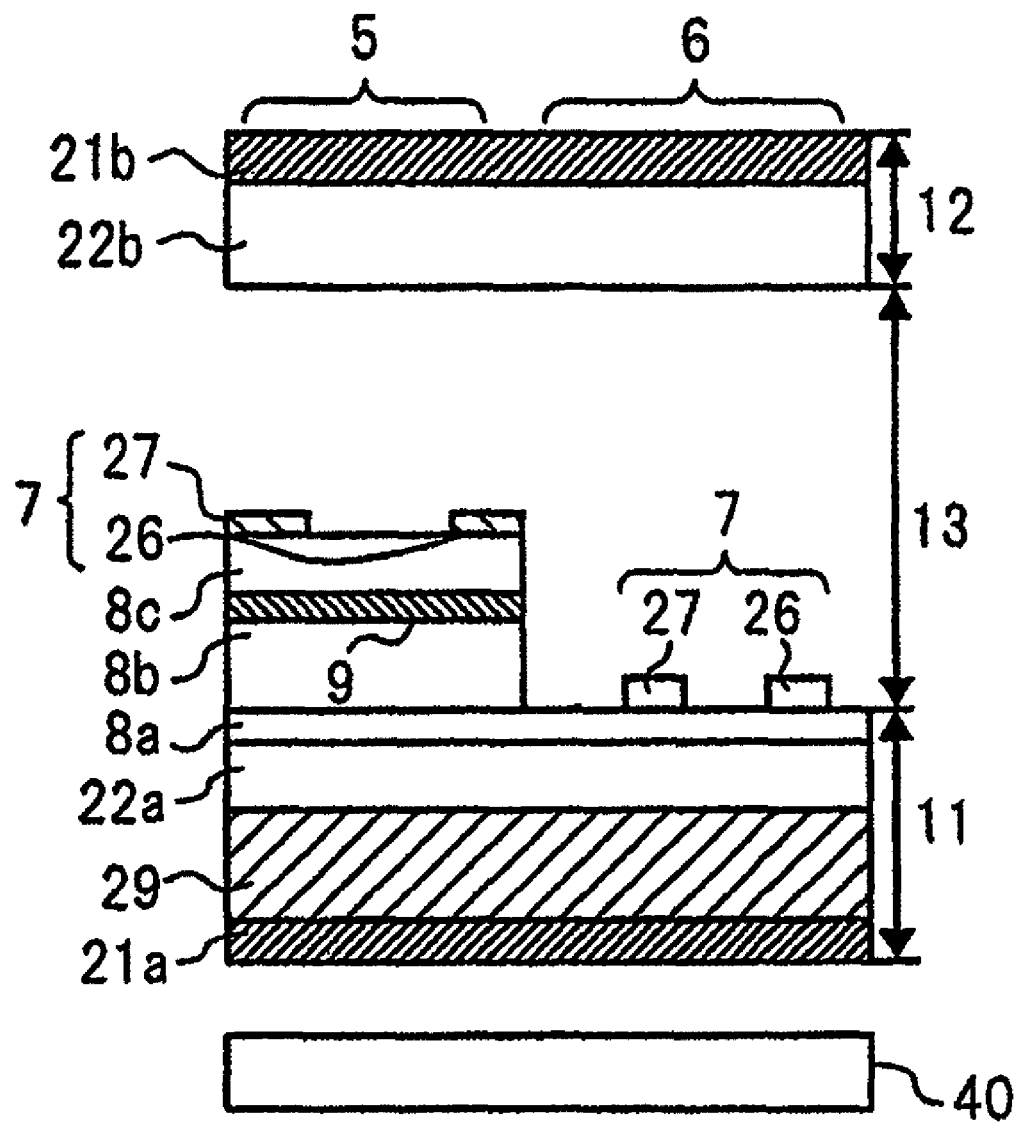
FIG. 1 is a cross-sectional view of a pixel of a display device disclosed in Patent document 3.
Figure 2:
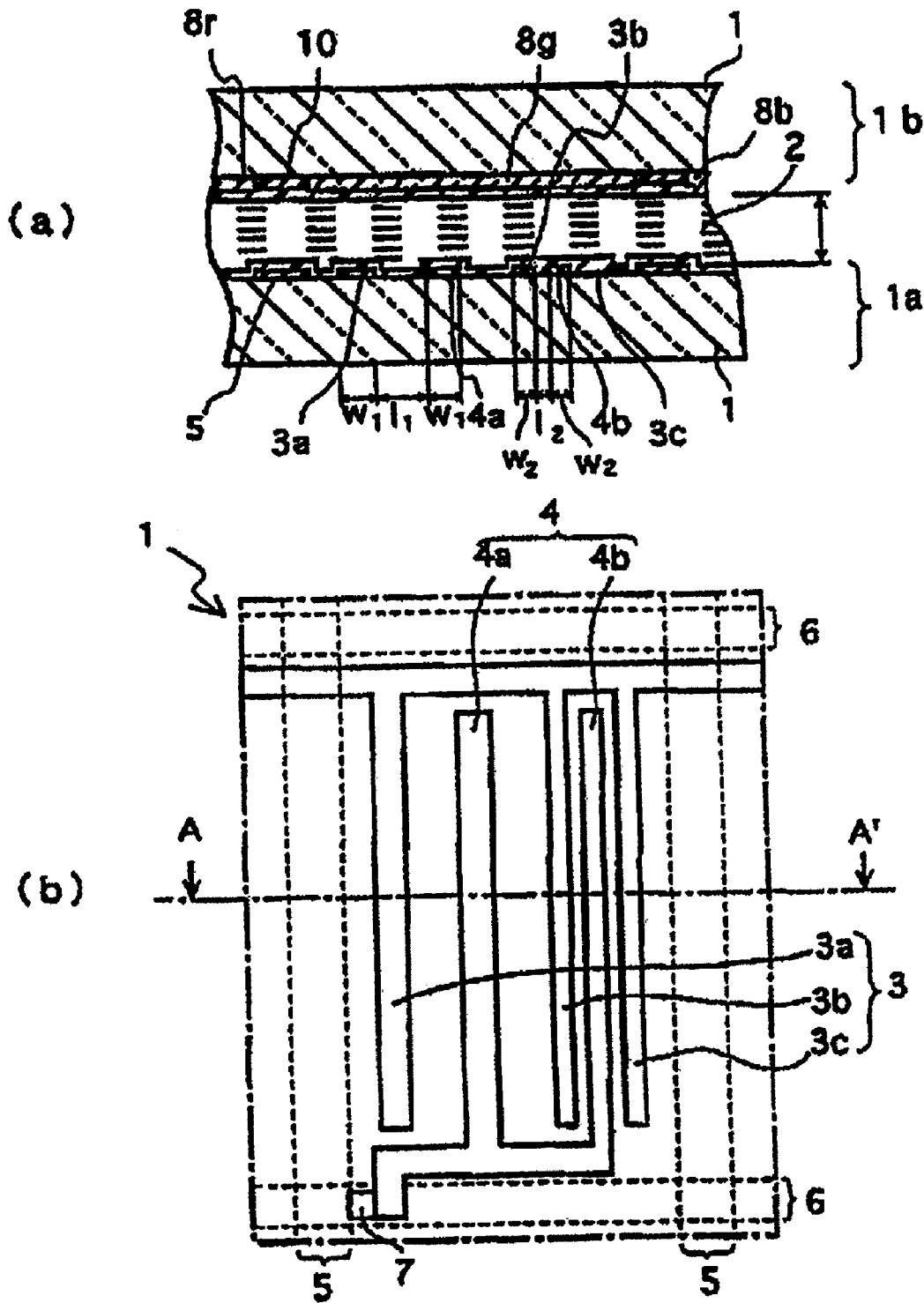
FIG. 2(a) is a cross-sectional view of a pixel of a display device disclosed in Patent document 4.
FIG. 2(b) is a plan view of the pixel of the display device disclosed in Patent document 4.
Figure 3:
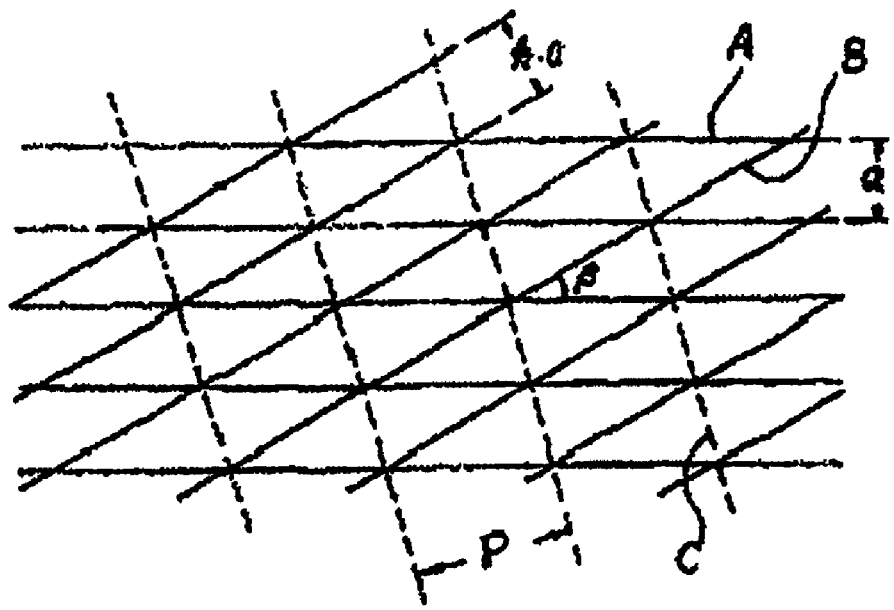
FIG. 3 is a plan view showing the layout of a light control film with respect to a display surface of the display device disclosed in Patent document 5.

According to a first aspect of the present invention, a liquid crystal display device comprises a plurality of pixels arrayed in a first direction and a second direction, each of the pixels having a reflective area in at least a portion thereof.

The reflective area comprises a surface-irregularity film with a plurality of surface irregularities, a light reflecting film disposed as an upper layer over the surface-irregularity film, and an electrode group disposed as an upper layer over the light reflecting film. The electrode group in each of the pixels that are arrayed in at least the first direction comprises at least two types of electrode patterns having different layouts.

Since the electrode group is disposed over the light reflecting film, the distance between a liquid crystal molecule layer and the electrode group is small, allowing an electric field to be applied efficiently to liquid crystal molecules for reduced power consumption.

Generally, the light reflecting film comprises a metal film having high reflectance. However, since the metal film is a conductor, if the light reflecting film is positioned at the same layer as the electrode group or at an upper layer over the electrode group, then it will adversely affect an electric field applied to energize the liquid crystal molecules, resulting in a reduction in the display quality of the liquid crystal display device. According to the present invention, since the light reflecting film is disposed as a lower layer beneath the electrode group, the liquid crystal display device is more reliable and has higher display quality.

There are certain process limitations on efforts to reduce the dimensions of the surface irregularities of the light reflecting film. For example, when a display device having a small pixel size and a limited reflective area, such as a high-definition display device, is manufactured, it is difficult to form and place a light reflecting film with surface irregularities and a plurality of electrode patterns separately in one plane.

However, if the electrode patterns are disposed over the light reflecting film according to the present invention, then the degree of freedom in designing the liquid crystal display device is increased. As a result, the number of man-hours required to design the liquid crystal display device is reduced, and hence the cost of the liquid crystal display device is lowered. It is easier to form smaller patterns for the liquid crystal display device, and the yield of liquid crystal display devices is increased.

A planarization layer may be disposed between the light reflecting film and the electrode group. Since the planarization layer thus positioned is effective for reducing the effect of the surface irregularities, it is possible to set an electrode width that can be minimized in an electrode fabrication process. As a consequence, the degree of freedom with which to design the liquid crystal display device is increased.

According to a second aspect of the present invention, at least two types of electrode patterns in each pixel are arrayed in the first direction. The array of electrode patterns is periodically changed in a plurality of pixels in the first direction.

In the claims and the specification, the phrase "periodically changed" refers to a configuration being repeatedly changed as the distance from a certain point in one direction changes.

In the second aspect, at least two types of electrode patterns are periodically arranged one-dimensionally in the first direction within a display surface, and the surface of the surface-irregularity film comprises a group of convexities that are arranged two-dimensionally.

For the sake of brevity, a simple model will be described below.

Figure 5:
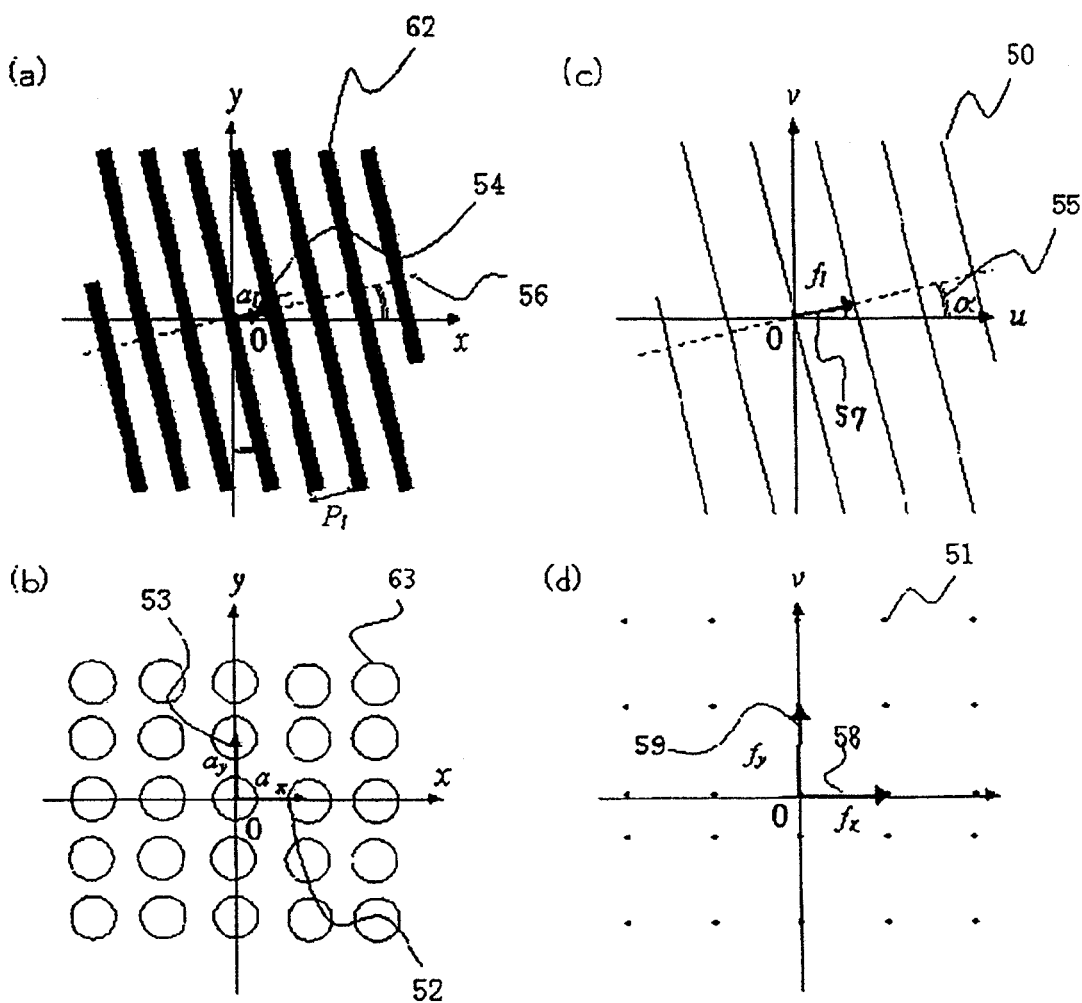
FIG. 5(a) is a graph showing stripes in an actual space.
FIG. 5(b) is a graph showing a two-dimensional lattice in an actual space.
FIG. 5(c) is a graph showing a one-dimensional lattice in a frequency space.
FIG. 5(d) is a graph showing a two-dimensional lattice in a frequency space.

FIG. 5(*a*) shows one-dimensional lattices on an xy plane in an actual space. In FIG. 5(*a*), one-dimensional stripes represent electrode patterns. Reference numeral 56 indicates the direction in which the stripes are periodically arrayed. One-dimensional lattices (hereinafter referred to as stripe patterns) can be represented by translation vector $T_1$ which is expressed according to the following equation (2):

$$T_1 = n\vec{a}_1 \quad (n\text{:integer}) \qquad (2)$$

where n represents an arbitrary integer and vector $a_1$ is a primitive translation vector corresponding to a one-dimensional period (hereinafter referred to as primitive translation vector $a_1$). Primitive translation vector $a_1$ shown in FIG. 5(a) is rotated through angle α 55 from a positive x-axis direction, and has a size $|a_1|$ of $P_1$. $P_1$ represents the sum of an electrode width and an opening area (an electrode-free area).

The surface-irregularity film according to the present invention includes a periodic two-dimensional array of concavities and convexities which comprise convex areas and concave areas. In the description which follows, the surface-irregularity film will be handled as a two-dimensional lattice. FIG. 5(b) is a diagram showing a two-dimensional lattice on an xy plane in an actual space. As shown in FIG. 5(d), in a surface-irregularity reflecting plate comprising a surface-irregularity film and a light reflecting layer, the surface irregularities on the surface of the reflecting plate can be expressed by translation vector $T_2$ according to the following equation (3), using primitive translation vectors $a_x$ 52, $a_y$ 53:

$$T_2 = l\vec{a}_x + m\vec{a}_y \quad (l, m: \text{integers}) \tag{3}$$

Sizes $|a_x|$, $|a_y|$ of primitive translation vectors $a_x$, $a_y$ are represented by $P_x$, $P_y$, respectively.

Frequency spaces corresponding to the lattices shown in FIGS. 5(a) and 5(b) will be described below.

FIG. 5(c) is a diagram showing a periodic structure which corresponds to stripe patterns (one-dimensional lattices) 62, as expressed in a frequency space. Lattice lines 50 corresponding to the stripe patterns are periodically present in the frequency space. A u-axis and a v-axis represent axes in the frequency space which correspond to x-axis and y-axis in the actual space. Vector $f_1$ 57 is a vector (hereinafter referred to as wave number vector $f_1$) in the frequency space which corresponds to primitive translation vector $a_1$ 54. Wave number vector $f_1$ is tilted through angle □ 55 from a positive u-axis direction, and has a size of $1/P_1$. Wave number vector $f_1$ is expressed according to the following equation (4):

$$f_1 = \frac{1}{P_1}(\cos\alpha, \sin\alpha) \tag{4}$$

Therefore, primitive translation vector $K_1$ in the frequency space which corresponds to one-dimensional lattice 62 shown in FIG. 5(a) is expressed according to the following equation (5):

$$\vec{K}_1 = n\vec{f}_1 \tag{5}$$

FIG. 5(d) is a digraph showing two-dimensional lattice 63 shown in FIG. 5(b) as expressed in a frequency space. Vectors $f_x$ 58, $f_y$ 59 (hereinafter referred to as wave number vectors $f_x$, $f_y$) in the frequency space which correspond to primitive translation vectors $a_x$, $a_y$ of the two-dimensional lattice are expressed according to the following equation (6):

$$f_x = \frac{1}{P_x}(1, 0), \quad f_y = \frac{1}{P_y}(0, 1) \tag{6}$$

Therefore, primitive translation vector $K_2$ in the frequency space which corresponds to two-dimensional lattice 63 shown in FIG. 5(b) is expressed according to the following equation (7):

$$\vec{K}_2 = l\vec{f}_x + m\vec{f}_y \tag{7}$$

Since (l, m) are arbitrary integers, there are many lattice points 51 (hereinafter referred to as inverse lattice points) corresponding to (l, m). A vector oriented from the origin toward an inverse lattice point represents a primitive translation vector.

A superposition of a stripe pattern, i.e., a one-dimensional periodic array of electrodes and a two-dimensional matrix of a reflecting plate surface-irregularity pattern will be described below.

A space wherein planes having two patterns are superposed one on the other generates a moiré pattern due to the interference between two geometric patterns. According to the related art, surface irregularities are randomly positioned to prevent an interference fringe from occurring. Actually, there is a lower limitation on the size of surface irregularities, posing a limitation on the number of surface irregularities that can be placed in a pixel. As the number of surface irregularities that are placed in a pixel is reduced, they are unable to produce an effect for dispersing light. A moiré pattern is likely to occur particularly under these conditions.

Especially, high-definition displays have small pixel sizes, which fail to provide a large reflecting area. As surface irregularities are difficult to position at random, a moiré pattern cannot be avoided, tending to allow an interference fringe to be visually recognized. Since a moiré pattern is a periodic pattern, the magnitude of the period of a moiré pattern will hereinafter be referred to as moiré period T.

Moiré period T at the time a one-dimensional array of pixel electrodes and a two-dimensional matrix of reflecting plate surface irregularities is calculated as described below. Vector $f = (f_U, f_v)$ in a frequency space of period T of a moiré pattern can be represented by a vector produced by combining translation vectors $K_1$, $K_2$ of one-dimensional and two-dimensional lattices in the frequency space. Vector f in a frequency space of period T of a moiré pattern will hereinafter be referred to as wave number vector f of the moiré pattern. Wave number vector f of the moiré pattern is expressed according to the following equation (8) from wave number vectors $f_x$, $f_y$ of the two-dimensional lattice and wave number vector $f_l$ of the one-dimensional lattice, based on the above equations (5), (7):

$$f = (f_u, f_v) = l\vec{f}_x + m\vec{f}_y + n\vec{f}_l \quad (l, m, n: \text{integers}) \tag{8}$$

Consequently, the magnitude of the moiré pattern period is expressed according to the following equation (9), using the relationship $T = 1/f$:

$$T = \frac{1}{\sqrt{f_u^2 + f_v^2}} \tag{9}$$

Angle β formed between the periodic direction of the moiré pattern and the positive x-axis direction is determined according to the following equation (10):

$$\beta = \arctan(f_v/f_u) \tag{10}$$

The synchronism and direction of a generated moiré pattern are thus calculated as described above.

As indicated by the above equation (8), the integers (l, m, n) are given in an arbitrary combination, and many moiré pattern periods are produced by such combinations. The many moiré pattern periods as arranged in descending order can be written as T1, T2, T3, . . . .

In practice, if moiré pattern period T is sufficiently small, then the moiré pattern causes no problem as it cannot be visually recognized by a human being. However, if moiré pattern period T is large, then the moiré pattern is visually recognized by the human eye and it makes the quality of displayed images low. Therefore, from a practical point of view it is an important question whether maximum moiré pattern period T is visually recognizable or not. If l, m, and n are small, moiré pattern period T is large as can be understood from equations (8) and (9). It is thus sufficient to assume that, if l, then m and n are small.

Because of the relationship T=1/f, the condition of integers (l, m, n) for minimizing the size |f| of wave number vector f of the moiré pattern is a condition for maximizing moiré pattern period T in the actual space.

If the convexities of the surface irregularities are placed to cover the surface uniformly, then since the distances between the convexities that are closest to each other are equal in any direction, equation (9) is rewritten, based on $P_1 = kP = (=kP_x = kP_y)$, into following equation (11):

$$T = \frac{P \cdot k}{\sqrt{(l \cdot \sin\alpha + m \cdot k)^2 + (l \cdot \cos\alpha + n \cdot k)^2}} \quad (11)$$

If lattices to be laminated are about the same size and rotational angle α is small, then the size |f| of wave number vector f of the moiré pattern is minimum when the integers are in combinations where each is ±1 or 1. Under this condition, moiré pattern period T is maximum. For the sake of brevity, a moiré pattern generated when (l, m, n)=(1, 0, −1) will be described below. However, the description below is not limited to such a combination of integers, but will be applicable to other combinations of integers. The equation (11) is rewritten, based on (l, m, n)=(1, 0, −1), into the following equation (12):

$$T = \frac{P_x \cdot k}{\sqrt{\sin^2\alpha + (\cos\alpha - k)^2}} \quad (12)$$

Figure 4:
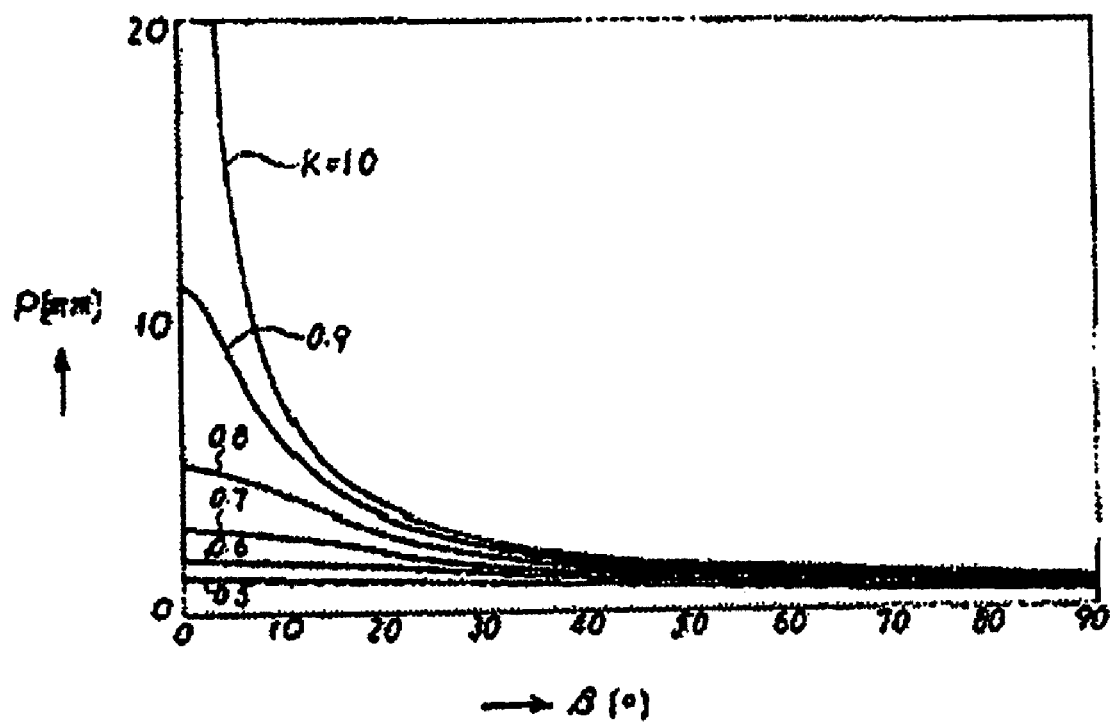
FIG. 4 is a graph showing the relationship between the angle β formed between the raster scan and the stripes of the light control film, and pitch p of a moiré pattern disclosed in Patent document 5.

Therefore, it can be seen from equation (12) that as the value of α is closer to 0, T is maximum at k≈1. In other words, it can be seen that moiré pattern period T is maximum at $P_1 \approx P_k$. As shown in FIG. 4, this is equivalent to the graph showing the relationship of moiré pattern periods disclosed in Patent document 5.

Figure 7:
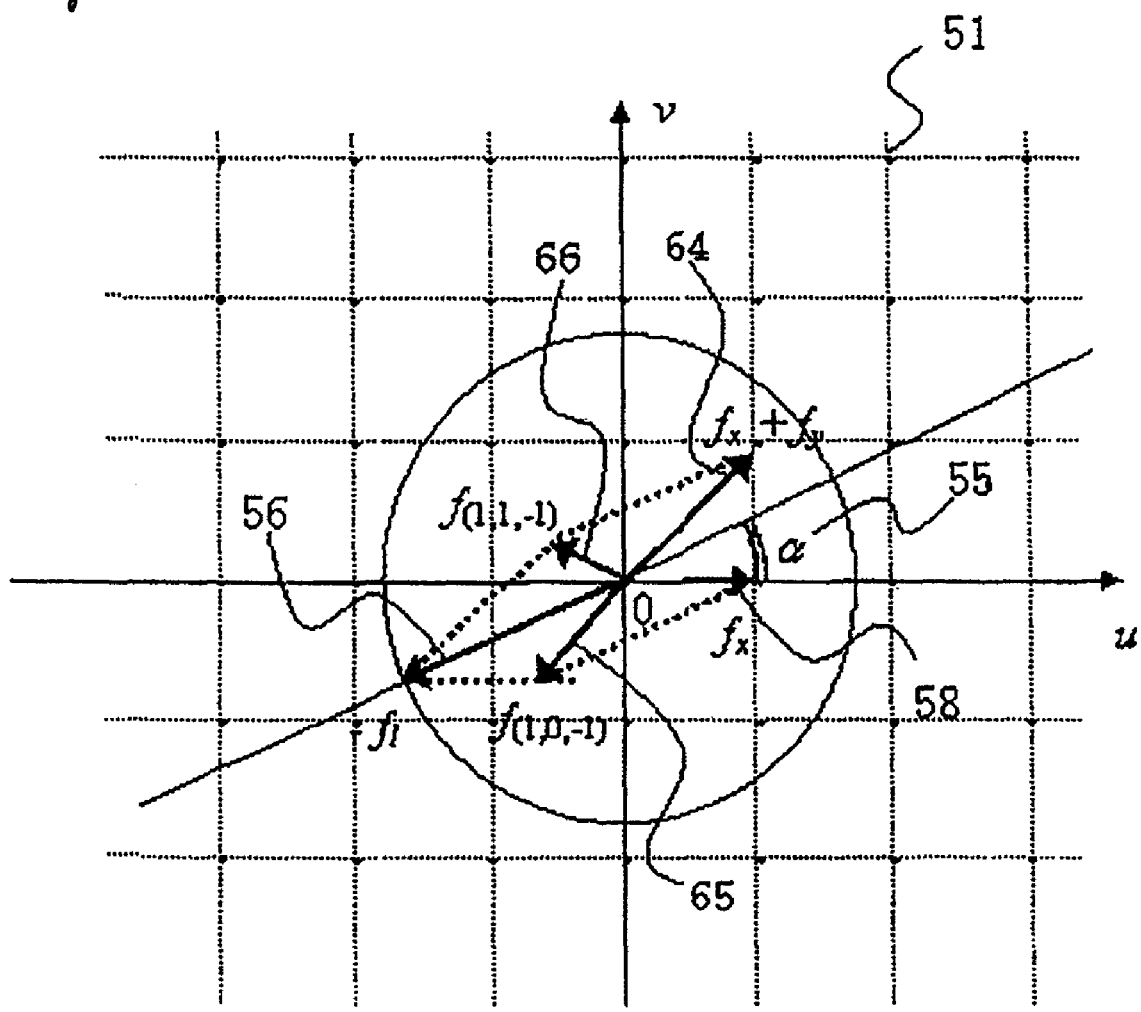
FIG. 7 is a graph showing vectors corresponding to moiré pattern periods in a frequency space coordinate system.

However, when the value of α is large, the moiré pattern period may be increased. Increasing the value of α will briefly be described below. If the value of α is relatively large, then, as shown in FIG. 7, the value of f in the frequency space is smaller for (l, m, n)=(1, 1, −1) than for (l, m, n)=(1, 0, −1), for example. The equation (11) is rewritten, based on (l, m, n)=(1, 1, −1), into the following equation (13):

$$T = \frac{P \cdot k}{\sqrt{(\sin\alpha - k)^2 + (\cos\alpha - k)^2}} \quad (13)$$

Figure 6:
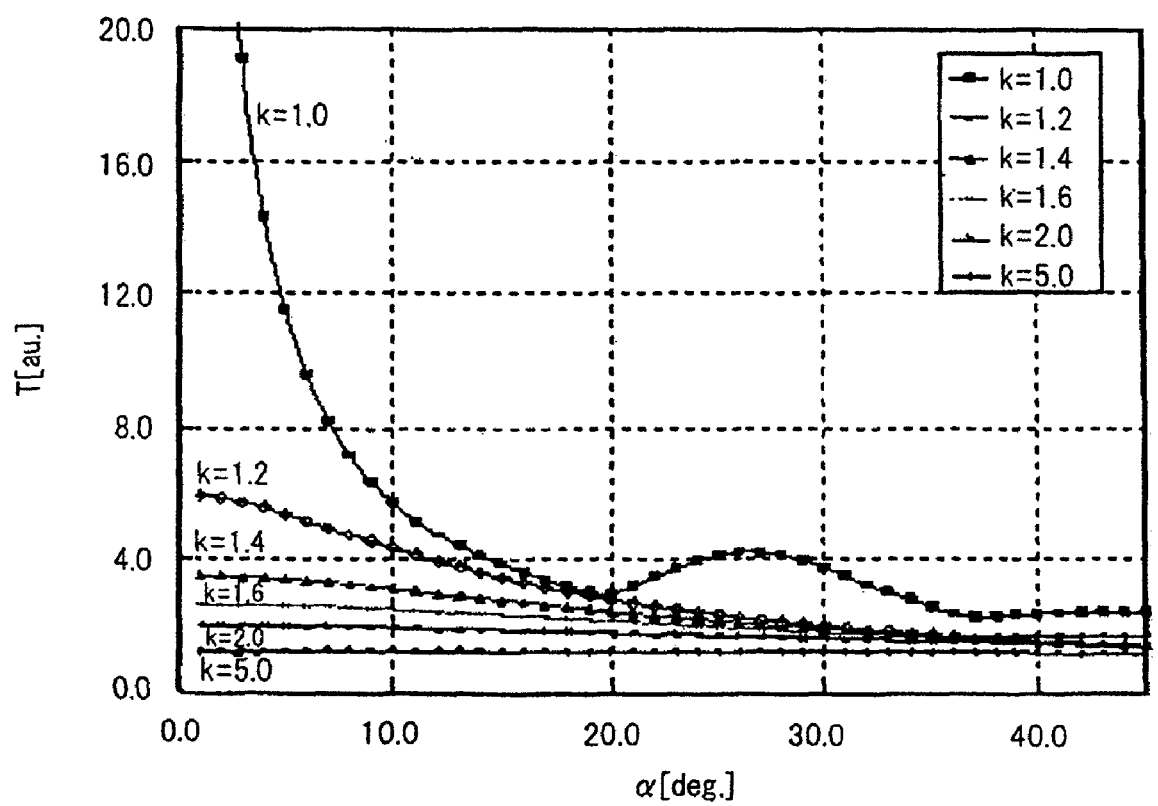
FIG. 6 is a graph showing the angles formed between the one-dimensional lattice and the two-dimensional lattice and the magnitudes of periods of moiré patterns.

FIG. 6 shows an example of values calculated according to the equations (12), (13). As shown in FIG. 6, as the value of α becomes larger, there is an area where the equation (13) is dominant. In other words, as the value of α becomes larger, the moiré pattern period becomes larger. This is because rotational angle α contains a component in the v direction (the fy direction) as it rotates. It can be understood that the moiré pattern period is not reduced simply when the value of α is increased.

It can also seen from FIG. 6 that increasing the value of k, rather than the value of α, is effective to reduce the moiré pattern period. Therefore, making the repetitive period of the electrode pattern greater than the repetitive period of the surface irregularity pattern is effective for reducing the moiré pattern generated by the electrode group and the surface irregularity pattern.

According to the second aspect of the present invention, therefore, since the repetitive period of the electrode patterns in a plurality of pixels arrayed in the first direction is greater than the repetitive period of the surface irregularity pattern in one pixel, the moiré pattern is effectively reduced. Since the periodicity is reduced by a plurality of types of electrode patterns provided in one pixel, the shades and highlights of the moiré pattern are so distributed that they cannot be visually recognized. If the period at which the electrode patterns are arrayed is greater, the diffraction due to light reflected by the electrodes is reduced, increasing the image quality.

According to a third aspect of the present invention, each of the electrode patterns in at least two types of layouts comprises an electrode pair including two electrodes extending in the second direction, and the electrode pitches in the first direction of the electrode pair of the electrode pattern in each of the layouts are different from each other.

According to the third aspect, the electrode pair generates a horizontal electric field or an oblique electric field for switching liquid crystal molecules in a plane, so that the liquid crystal display device has a wide viewing angle. Furthermore, since the plural different electrode pairs are disposed in the pixels, the director directions of the liquid crystal molecules in one pixel are distributed to reduce colorations.

According to a fourth aspect of the present invention, the same electrode pair is axisymmetrically disposed with respect to the central axis of the pixel which is parallel to a longitudinal direction of the pixel.

According to the fourth aspect, as the electrode pair in one pixel is axisymmetrically disposed with respect to the central axis of the pixel, the symmetry of a viewing angle distribution and a luminance distribution is improved for the display of high-quality images. As the electric field applied to the liquid crystal molecules is uniformized, the liquid crystal molecules are pre-vented from being deteriorated, and the display device is increased in reliability.

According to a fifth aspect of the present invention, the numbers of electrode patterns made up of electrode pairs disposed in the respective pixels are the same as each other.

According to the fifth aspect, the aperture ratio or the reflecting area ratio of all the pixels on the display surface is of a constant value. Therefore, the luminance irregularities of the respective pixels are reduced to reduce display irregularities, high-quality images can be displayed. Since the V-T characteristics (voltage-vs-transmittance characteristics) of the respective pixels have reduced irregularities, the display device is of high performance as its γ characteristics (gradation characteristics) have smaller irregularities.

Furthermore, the display device is of increased reliability because the electric field applied to the liquid crystal molecules is uniformized to prevent the liquid crystal molecules from being deteriorated.

According to a sixth aspect of the present invention, if it is assumed that the size of each pixel in the first direction is represented by D, the minimum distance between the apexes of convexities of surface irregularities of the light reflecting film in the pixel is represented by M, and the magnitude of the repetitive period of the electrode pairs in the pixels arrayed in the first direction is represented by R, the following inequality (14) is satisfied:

$$M < RM/(R-M) < 3D \tag{14}$$

If the magnitude of the period of the array of the pixels is of a size that can be visually recognized by the human eye, then it is responsible for the display irregularities. For example, if an image is displayed in three colors, then it is customary to assign three pixels to R, G, B, respectively, and handle them as one unit. In this case, the size of such a unit is required to be small enough to be visually unrecognizable when the observer observes the display screen. Therefore, if the size of a pixel in the first direction is represented by D, then magnitude T of the moiré pattern period should desirably be smaller than 3D.

The size of the surface irregularities of the surface-irregularity film is designed to be small as the surface-irregularity film needs to distribute and reflect external light uniformly. It is desirable that the distance between the electrodes should be as large as possible in order to increase the reflectance.

Consequently, magnitude T of the moiré pattern period caused by distance M between the convexities, which are closest to each other, of the surface irregularities of the light reflecting film and the magnitude R of the repetitive period of the electrode patterns in the first direction is greater than distance M between the convexities.

Moiré pattern period T satisfies the following inequality (15):

$$M < T < 3D \tag{15}$$

If only the one-dimensional period in the first direction is taken into account, then angle α is of a value which is infinitely close to 0. Based on this fact, equation (11) is rewritten into the following equation (16):

$$T = \frac{R \cdot M}{(R - M)} \tag{16}$$

The above equation (14) is thus calculated according to equations (15), (16). Insofar as equation (14) is satisfied, no moiré pattern is visually recognizable on the liquid crystal display device, and the liquid crystal display device is capable of displaying high-quality images.

According to a seventh aspect of the present invention, the light reflecting film is made of electrically conductive metal, and is used as an electrode for applying an electric field to the liquid crystal molecules to drive them.

Since the light reflecting film is used as the electrode for driving the liquid crystal molecules, the number of manufacturing steps is reduced and the cost of the liquid crystal display device is lowered.

According to an eighth aspect of the present invention, a terminal device incorporates the liquid crystal display device of the above structure.

According to a ninth aspect of the present invention, such a terminal device may comprise a cellular phone, a personal information terminal, a game machine, a digital camera, a video camera, a video player, a notebook PC, a cash dispenser, or an automatic vending machine.

EXEMPLARY EMBODIMENTS OF THE INVENTION

Exemplary embodiments of the present invention will be described below with reference to the accompanying drawings. However, the present invention is not limited to the structural details illustrated in the drawings.

1st Aspect of First Exemplary Embodiment

A liquid crystal display device according to a first exemplary embodiment of the present invention will be described below. The liquid crystal display device according to the present invention comprises a matrix of pixels each divided into three auxiliary pixels (hereinafter referred to as "dot"). In the present exemplary embodiment, the pixel shown in Patent documents 3, 4 corresponds to one dot. However, a "pixel" recited in the claims refers to a dot according to the present exemplary embodiment.

Figure 8:
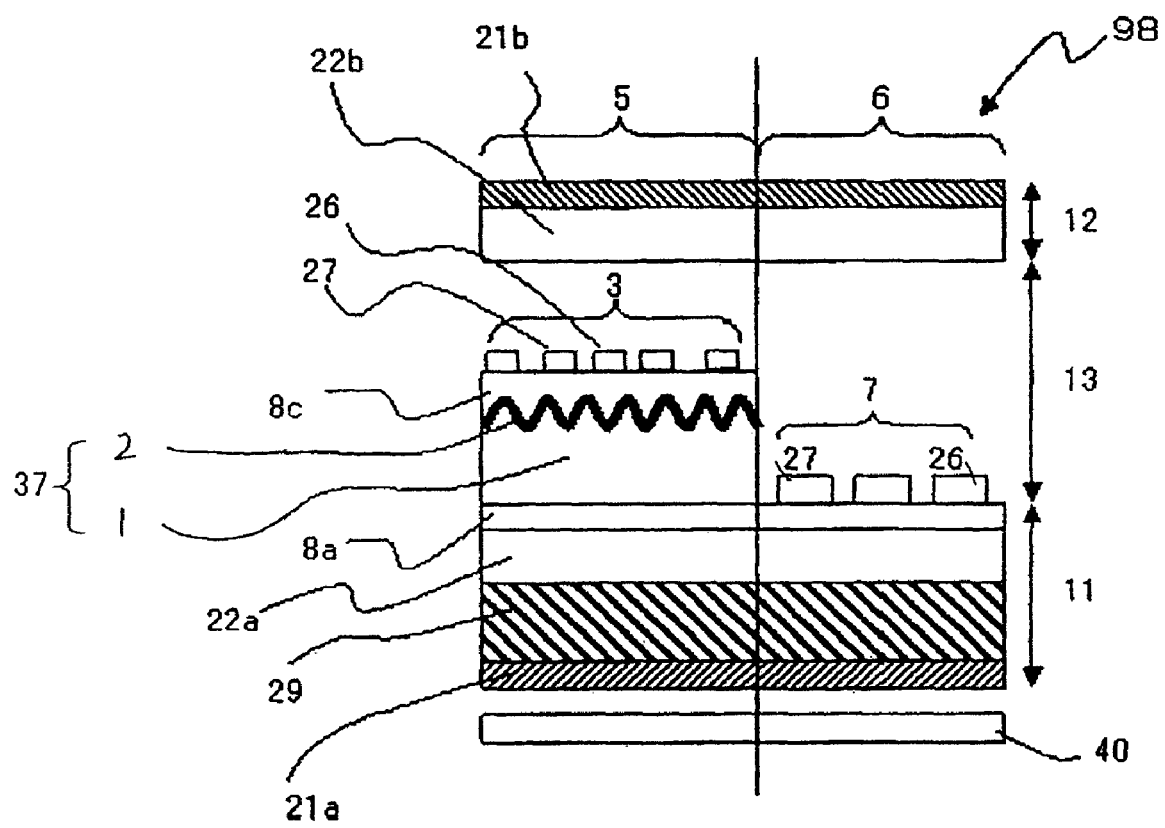
FIG. 8 is a cross-sectional view showing a pixel of a liquid crystal display device according to a first aspect of a first exemplary embodiment of the present invention.
Figure 9:
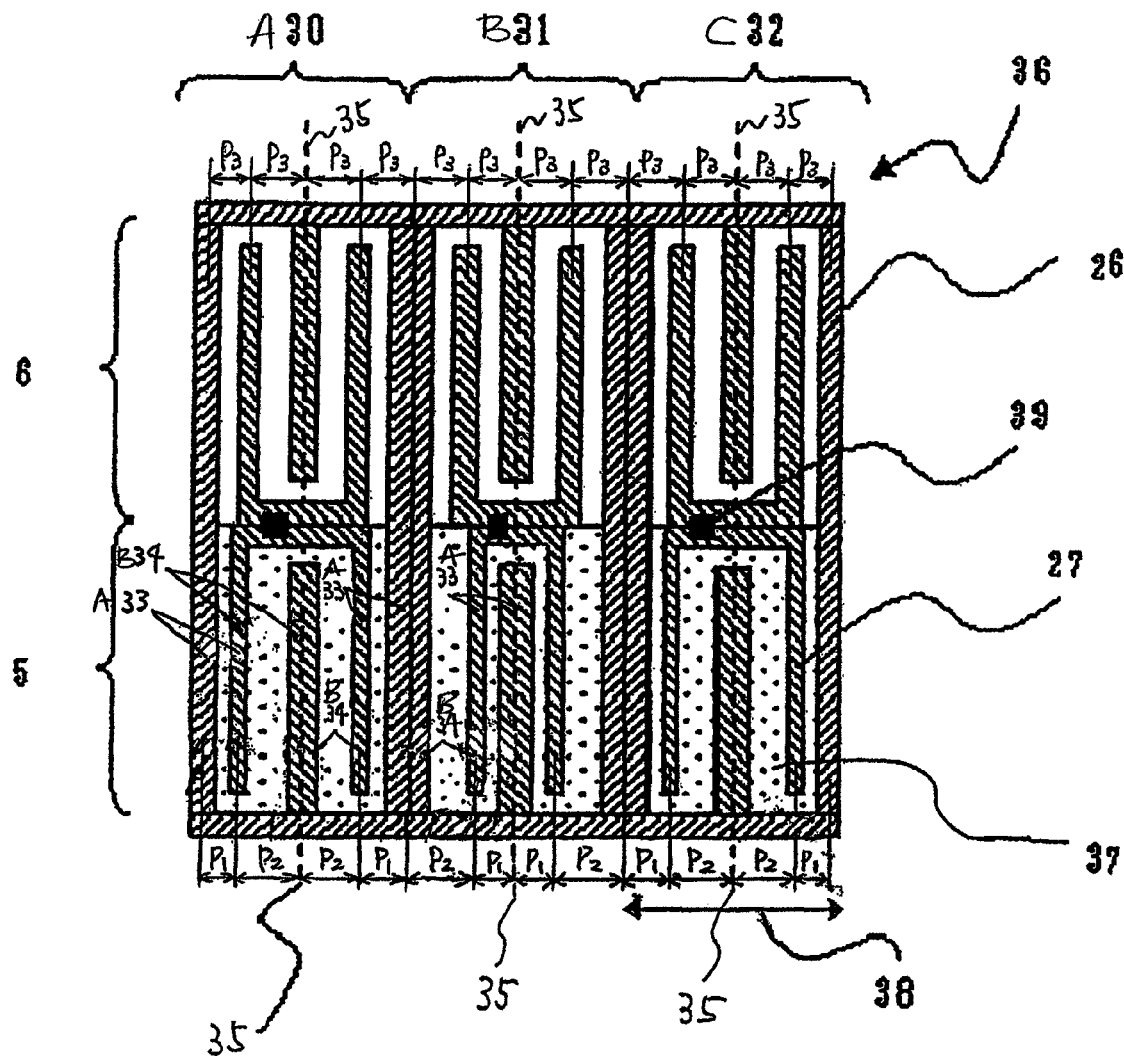
FIG. 9 is a plan view showing the pixel of the liquid crystal display device according to the first aspect of the first exemplary embodiment of the present invention.

FIG. 8 shows a cross section of one dot of the liquid crystal display device according to the first exemplary embodiment, and FIG. 9 shows a plan view of a pixel made up of three dots 30, 31, 32.

As shown in FIG. 8, semitransmissive liquid crystal display device 98 comprises lower substrate 11, upper substrate 12, liquid crystal layer 13 sandwiched between substrates 11, 12, and backlight 40 disposed below lower substrate 11. Lower substrate 11 and upper substrate 12 have respective polarizers 21a, 21b on their outer sides.

First insulating film 8a is disposed on the surface of lower substrate 11 which faces liquid crystal layer 13.

Semitransmissive liquid crystal display device 98 includes reflective area 5 and transmissive area 6. In reflective area 5, surface-irregularity film 1 is disposed on first insulating film 8a, and light reflecting film 2 is disposed on surface-irregularity film 1. Third insulating film 8c is disposed on light reflecting film 2, and horizontal-electric-field electrode 3 is disposed on third insulating film 8c. In transmissive area 6, horizontal-electric-field electrode 7 is disposed on first insulating film 8a. In the present exemplary embodiment, light reflecting film 2 and surface-irregularity film 1 are referred to as surface-irregularity reflecting plate 37. The reflecting plate surface irregularity pattern as shown in FIG. 5(b) is present in the reflective area of the liquid crystal display device according to the present exemplary embodiment.

Horizontal-electric-field electrode 3 comprises pixel electrodes 27 and common electrodes 26 which extend parallel to each other. The liquid crystal molecules of liquid crystal layer 13 are driven by an electric field generated between pixel electrodes 27 and common electrodes 26. The electrode group in the stripe pattern as shown in FIG. 5(a) are present in the reflective area of the liquid crystal display device according to the present exemplary embodiment.

Upper substrate 12 comprises transparent insulating substrate 22b, a black matrix layer disposed as a light shielding film on transparent insulating substrate 22a, a color layer partially overlapping the black matrix layer, and a transparent overcoat layer disposed on the black matrix layer and the color layer.

To prevent liquid crystal layer 13 from being electrically affected by charges that are generated by contact with the surface of the liquid crystal display panel, a transparent conductive layer is disposed on the reverse side of transparent insulating substrate 22b. The color layer referred to above comprises a resin film containing dyes or pigments of red (R), green (G), and blue (B).

First insulating film 8a on transparent insulating substrate 22a of lower substrate 11 includes a first metal layer, a first interlayer insulating film disposed on the first metal layer, a second metal layer disposed on the first interlayer insulating film, and a second interlayer insulating film disposed on the second metal layer.

The first metal layer includes scanning lines (not shown) that are to be supplied with a scanning signal and the gate electrodes (not shown) of thin-film transistors (TFTs).

The second metal layer includes data lines (not shown), and thin-film transistors (not shown).

The data lines are supplied with a data signal. Common electrodes 26 which are to be supplied with a reference potential and pixel electrodes 27 are disposed as transparent electrodes (ITO) on the second interlayer insulating film.

Lower substrate 11 and upper electrode 12 are bonded together such that they face each other. Before lower substrate 11 and upper electrode 12 are bonded together, alignment films are applied to the respective surfaces of lower substrate 11 and upper electrode 12 that face each other, and are rubbed to orient liquid crystal layer 13 homogeneously in a direction that is inclined an angle ranging from 10 to 30 degrees from the direction (the vertical direction in FIGS. 5(a) through 5(d)) in which pixel electrodes 27 and common electrodes 26 extend.

A spacer for maintaining the thickness of liquid crystal layer 13 is disposed between lower substrate 11 and upper electrode 12. A seal is disposed around liquid crystal layer 13 to prevent liquid crystal molecules from leaking out.

Each pixel of semitransmissive liquid crystal display device 98 is marked off by a scanning line and a data line.

Each of the thin-film transistors on lower substrate 11 comprises a gate electrode, a drain electrode, and a source electrode, and is disposed in association with one pixel near the intersection between the scanning line and the data line.

The gate electrode is electrically connected to the scanning line, the drain electrode to the data line, and the source electrode to pixel electrodes 27.

Common electrodes 26 and pixel electrodes 27 of each of dots 30, 31, 32 are of a combtoothed shape, and have comb teeth extending parallel to the data lines (not shown) which extend vertically in FIG. 9.

The comb teeth of common electrodes 26 and pixel electrodes 27 are interdigitated and spaced apart from each other.

Common electrodes 26 of each of dots 30, 31, 32 are connected to a common electrode line (not shown) through contact holes (not shown) in reflective area 5 and transmissive area 6.

Pixel electrodes 27 of each of dots 30, 31, 32 have a common region connected to the source electrode (not shown) of a TFT through contact hole 39.

Since common electrodes 26 and pixel electrodes 27 are connected to the common electrode line and the source electrode through respective contact holes in reflective area 5 and transmissive area 6, the resistance values of the common electrodes and the pixel electrodes are reduced. Accordingly, the delay time is prevented from increasing due to a high line resistance value.

Semitransmissive liquid crystal display device 98 wherein both reflective area 5 and transmissive area 6 employ the horizontal-electric-field drive scheme (the IPS system) is capable of displaying images as follows:

A pixel which stores a data signal supplied through a data line is selected by a scanning signal supplied through a scanning line. In the selected pixel, an electric field parallel to transparent insulating substrates 22a, 22b is generated between common electrodes 26 and pixel electrodes 27.

The electric field rotates the oriented direction of the liquid crystal molecules within a plane parallel to transparent insulating substrates 22a, 22b, thus displaying an image.

In FIG. 9, a vertically elongate area surrounded by common electrodes 26 and pixel electrodes 27 that are closest to each other is referred to as a column. Common electrodes 26 and pixel electrodes 27 that are closest to each other are referred to as an electrode pair, and the distance between the central line of one of the electrodes of an electrode pair and the central line of the other electrode is referred to as an electrode pitch.

In semitransmissive liquid crystal display device 98 according to the present exemplary electrode, common electrodes 26 and pixel electrodes 27 are made of ITO in the same layer.

In reflective area 5 and transmissive area 6, common electrodes 26 are disposed in a layer above the scanning lines and the data lines and are wider than the scanning lines and the data lines so that common electrodes 26 fully cover the scanning lines and the data lines.

In reflective area 5, surface-irregularity reflecting plate 37 which is made up of light reflecting film 2 and surface-irregularity film 1 is disposed in a layer above the scanning lines and the data lines and fully covers the scanning lines and the data lines.

Common electrodes 26 and surface-irregularity reflecting plate 37 thus constructed serve to block electric field leakage from the data lines and the scanning lines, thereby increasing the effective display area that can be controlled by the electric field between pixel electrodes 27 and common electrodes 26 and hence increasing the aperture ratio of the pixel.

Similarly, surface-irregularity reflecting plate 37 may be constructed to cover the channel area of the TFT. If surface-irregularity reflecting plate 37 is thus constructed, it blocks an electric field tending to enter the TFT from an external source. Therefore, the stability of the TFT characteristics is increased for higher display reliability. Surface-irregularity reflecting plate 37 also blocks light tending to enter the TFT from an external source, thereby reducing light leakage. Accordingly, the stability of the TFT characteristics is increased for higher display reliability.

In transmissive area 6, common electrodes 27 and pixel electrodes 26 are disposed on the second interlayer insulating film of first insulating film 8a. In reflective area 5, common electrodes 27 and pixel electrodes 26 are disposed on third insulating film 8c.

As common electrodes 27 and pixel electrodes 26 are disposed on the same layer, they can be formed of the same material in the same step. As a result, semitransmissive liquid crystal display device 98 can be manufactured with higher efficiency.

In semitransmissive liquid crystal display device 98, the film structure ranging from transparent insulating substrate 22a to first insulating film 8a of lower substrate 11 is common between transmissive area 6 and reflective area 5, and can be formed in the same step.

As shown in FIG. 9, one pixel comprises three dots, i.e., dot A30, dot B31, and dot C32. Reflective area 5 of one dot includes two types of different electrode patterns (parallel electrode pairs A33, parallel electrode pairs B34). The electrode pattern of pixel electrode 37 in reflective area 5 is different from the electrode pattern of pixel electrode 37 in transmissive area 6, so that electrode pairs A33 and electrode pairs B34 have different electrode pitches. In FIG. 9, electrode pitch $P_2$ of electrode pairs B34 is greater than electrode pitch $P_1$ of electrode pairs A33.

In reflective area 5 of dot A30, electrode pairs A33 and electrode pairs B34 of the two types are arrayed in the sequence of electrode pair A33, electrode pair B34, electrode pair B34, and electrode pair A33 in the positive X-axis direction. As a result, electrode pairs A33 and electrode pairs B34 are axisymmetrically disposed with respect to central line 35 of dot A30 in reflective area 5.

In reflective area 5 of dot B31, electrode pairs A33 and electrode pairs B34 of the two types are arrayed in the sequence of electrode pair B34, electrode pair A33, electrode pair A33, and electrode pair B34 in the positive X-axis direction. As a result, electrode pairs A33 and electrode pairs B34 are axisymmetrically disposed with respect to central line 35 of dot B31 in reflective area 5. Therefore, dot A30 and dot B31 serve as auxiliary pixels having different electrode configurations.

In dot C32, electrode pairs A33 and electrode pairs B4 are axisymmetrically disposed with respect to central line 35 of dot C32. In reflective area 5, electrode pairs A33 and electrode pairs B34 are arrayed in the sequence of electrode pair A33, electrode pair B34, electrode pair B34, and electrode pair A33 in the positive X-axis direction. Accordingly, dot C32 is of the same structure as dot A30.

In transmissive area 6 of each of dots 30, 31, 32, two electrode pairs of same electrode pitch $P_3$ are axisymmetrically disposed with respect to central line 35 of the dot. As a result, the electrode pairs of one type are arrayed in the positive X-axis direction in transmissive area 6.

As shown in FIG. 9, each dot is of a rectangular shape having a shorter side extending along the X-axis and a longer side, perpendicular to the shorter side, extending along the Y-axis. The array of electrode patterns of electrode pairs shown in FIG. 9 will be described below. Unless otherwise noted, the positive Y-axis direction will be referred to as an upward direction in FIG. 9, and the positive X-axis direction as a rightward direction.

In the display surface, the pixels are arranged in a matrix in X- and Y-axes directions. Dots A30, B31 are alternately arranged in the positive X-axis direction. The dots in one pixel in the display surface are arrayed in the positive X-axis direction according to two sequences, i.e., the sequence of dots A30, B31, A30 and the sequence of dots B31, A30, B31. The pixels that are made up of the dots arrayed in the two sequences are alternately arranged in the positive X-axis direction. In FIG. 9, the three dots arrayed in the positive X-axis direction are represented by 30, 31, 32. As described above, dot C32 is of the same structure as dot A30.

In the present exemplary embodiment, dots A30, B31 are alternately arranged in the positive Y-axis direction. The dots in the display surface according to the present exemplary embodiment are of a checkerboard pattern in which dots A30, B31 are alternately arranged in the positive X-axis direction and the positive Y-axis direction.

However, the dots may be of a striped pattern in which dots A30, B31 are alternately arranged in the positive X-axis direction and dots of the same type are successively arranged in the positive Y-axis direction.

Figure 10:
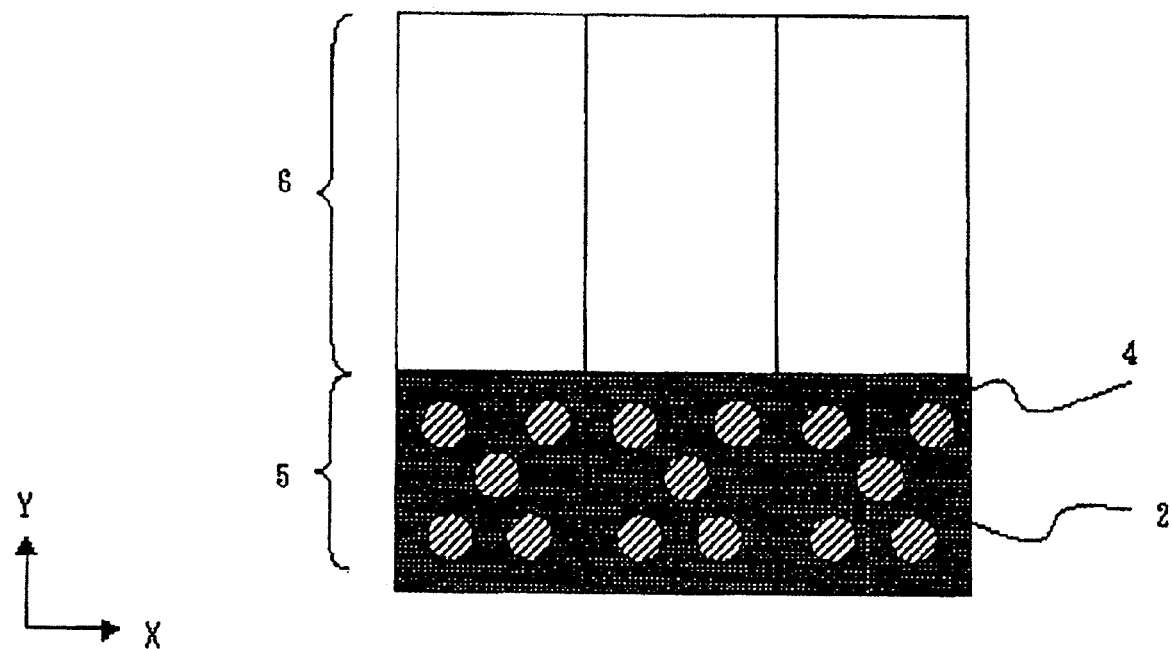
FIG. 10 is a plan view showing a reflecting place with surface irregularities of the liquid crystal display device according to the first aspect of the first exemplary embodiment of the present invention.

FIG. 10 shows a plan view of light reflecting film 2 in one pixel according to the present exemplary embodiment. Light reflecting film 2 has a surface made up of convexities arranged two-dimensionally. Reflective area 5 of one dot includes five convexities 4 of one type, each being of a circular shape as viewed from above the display surface. Since convexities 4 are located in the same positions in the dots, they are repetitively arranged at the same period as the dot pitch in the display surface.

The number of convexities 4 is not limited to the illustrated embodiment. One dot may include at least one convexity. Each convexity 4 as viewed from above the display surface is not limited to the circular shape, but may be of a polygonal shape including a circular shape, a square shape, a pentagonal shape, etc.

According to the present exemplary embodiment, each pixel is made up of (3×1) dots. Specifically, a pixel which is 111 μm long in the X-axis directions (horizontal directions) and 111 μm long in the Y-axis directions (vertical directions) is divided into three auxiliary pixels (dots) having the same size. Each of the auxiliary pixels is of a rectangular shape which is 37 μm long horizontally and 111 μm long vertically.

Each pixel is divided into three colors including red (R), green (G), and blue (B) which are periodically arrayed as stripes in a direction perpendicular to the longer sides of the dots. In the present exemplary embodiment, the color stripes are arrayed in the sequence of red (R), green (G), and blue (B) in the positive X-axis direction from the end of the pixel.

Specifically, the R, G, B colors that are arrayed in the sequence of red (R), green (G), and blue (B) in the positive X-axis direction from the end of the pixel are assigned respectively to the three dots of the pixel. However, the colors are not limited to the above sequence.

The colors may be arranged in any sequence insofar as the pixel is divided into the three R, G, B colors and they are periodically arrayed.

If the number N of colors of the pixel is four or more, then the pixel may be divided into (1×N) auxiliary pixels (dots), and color filters in the form of color layers may be periodically arrayed in the direction perpendicular to the longer sides of the dots. The four or more colors assigned to each pixel are capable of producing more color representations and gradations.

According to the present exemplary embodiment, the color layers of the color filters in upper substrate 11 include colorless regions. Usually, light reflected from light reflecting film 2 passes the color filters twice. Accordingly, the chromaticity is greater in reflective area 5 than in transmissive area 6, and the observer who sees the displayed image feels somewhat strange due to the different colors in the reflective display mode and the transmissive display mode.

However, the colorless regions make it possible to reproduce the same chromaticity in the reflective display mode as that in the transmissive display mode, so that the liquid crystal display device can display high-quality images.

According to the present exemplary embodiment, in particular, the colorless regions can be placed in different positions in each pixel. If the repetitive period of the colorless regions in the positive X-axis direction is in agreement with the dot pitch, then reflection irregularities in the reflective display mode are reduced and uniformized in the display surface.

The areas of the colorless regions are determined depending on the transmittance of the color filters with respect to the colors thereof. Therefore, the areas of the colorless regions are different for the colors of red (R), green (G), and blue (B). In the present exemplary embodiment, the areas of the colorless regions for red (R), green (G), and blue (B) have a ratio of 2:3:2.

Operation of semitransmissive liquid crystal display device 98 according to the present exemplary embodiment will be described below.

According to the present invention, the repetitive period of electrode patterns of the same shape can be greater than the average distance between the adjacent convexities in reflective area 5. Therefore, the moiré pattern generated by the electrode pattern and the surface-irregularity pattern in the reflective area is reduced.

For example, it is assumed that three columns made up of electrode pairs having an electrode pitch of 11 μm are periodically arrayed in the range of a dot pitch of 37 μm and convexities 4 in reflective area 5 are arranged such that the distance between adjacent convexities is 10.5 μm.

In such a structure, period T of the moiré pattern generated by the electrode pitch and the period of surface irregularities is calculated as 200 µm according to the above equation (11). Since period T of the moiré pattern is greater than the pixel size of 111 µm and is visually recognizable by the human eye, the moiré pattern greatly reduces the quality of displayed images.

In the liquid crystal display device according to the present exemplary embodiment, the electrode pairs on each dot have no periodicity. In addition, the two different dots of electrode patterns made up of a plurality of electrode pairs are alternately arrayed in one direction, the repetitive period of the electrode patterns of the same shape is represented by two dots (every other dot). Accordingly, there is no characteristic periodicity for producing a large moiré pattern, and any moiré pattern that is generated is reduced to the extent that it is visually unrecognizable by the human eye.

According to the present exemplary embodiment, since the period of a moiré pattern is reduced to the extent that it is visually unrecognizable by the human eye, the observer can observe displayed images of high quality without being distracted by moiré patterns. As the periodicity of electrode patterns is distributed, diffraction due to light reflected from the electrodes is reduced.

According to the present exemplary embodiment, the repetitive period of the electrode pitch is represented by two dots, i.e., 74 µm.

Period T of the moiré pattern generated by the electrode pitch and convexities in reflective area 5 which are arranged such that the distance between adjacent convexities is 10.5 µm is calculated as 12 µm according to the above equation (11). This is because period T of the moiré pattern is greater than the pixel size of the distance between adjacent convexities, which is 10.5 µm, and smaller than the pixel size of 111 µm. Since moiré pattern period T is not visually recognizable by the human eye, the observer can observe displayed images without being distracted by moiré patterns.

Figure 11:
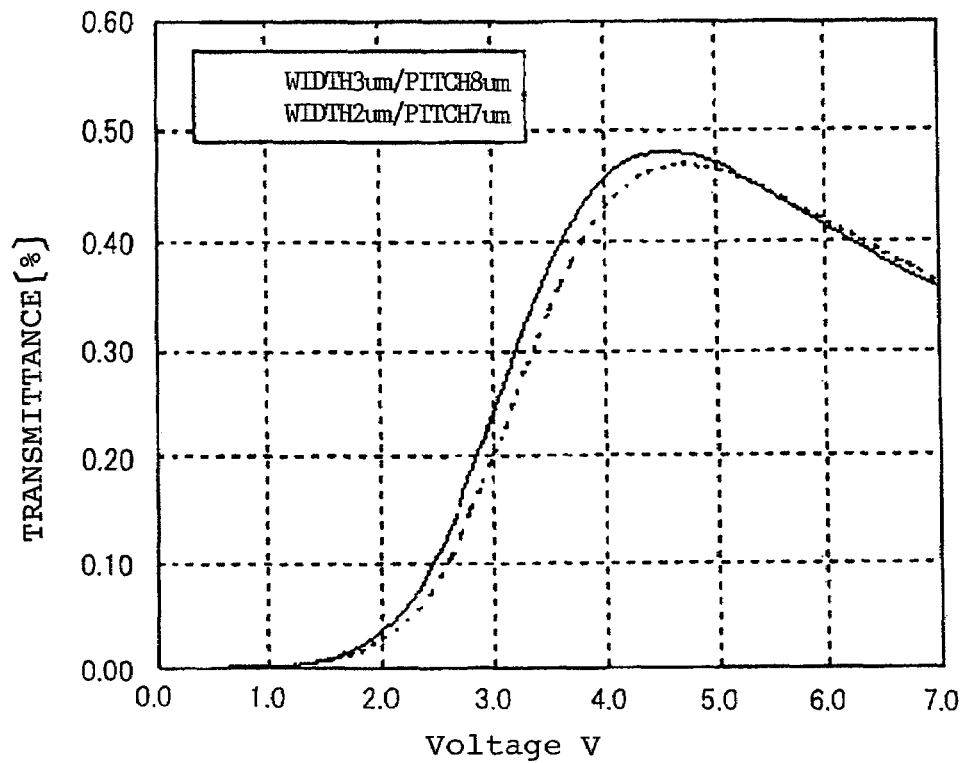
FIG. 11 is a graph showing transmittance-vs-voltage characteristics (V-T characteristics) of electrode pairs made of ITO on the same layer.

FIG. 11 shows transmittance-vs-voltage characteristics (V-T characteristics) of electrode pairs (electrode pair A33 and electrode pair B34) of two types applied to the present exemplary embodiment. In the present exemplary embodiment, an electrode pitch of 11 µm (a width of 3 µm/an interval of 8 µm) and an electrode pitch of 9 µm (a width of 2 µm/an interval of 7 µm) are applied so that the V-T characteristics will not vary greatly. Because the luminance is averaged by the light reflected diffusely by the surface-irregularity reflecting plate, the observer feels less strange at the time of seeing the displayed image.

Advantages of the present exemplary embodiment will be described below.

According to the present invention, different parallel electrode pairs A, B of two types are present in the reflective area of each pixel. The pixel is divided into a plurality of dots (auxiliary pixels) arrayed in the first direction, and electrode pairs A, B are differently arrayed and combined in adjacent two dots and identically arrayed and combined in every other dot. As shown in FIG. 9, dot A30 including an electrode structure in which the electrode pairs are arrayed in the sequence of A33, B34, B34, A33 in the positive X-axis direction and dot B31 including an electrode structure in which the electrode pairs are arrayed in the sequence of B34, A33, A33, B34 in the positive X-axis direction, are alternately repeated in the first direction.

The periodicity at the dot pitch of the pixel electrodes is thus eliminated, and the pixel electrode period can be made larger than the surface-irregularity pitch period of the light reflecting film, thereby reducing any moiré pattern.

Because two combinations of electrode pairs of two types are disposed in a dot, and the electrode configuration is axisymmetrical with respect to central axis 35 of the dot, the electrode pairs are highly symmetrical in the X-axis directions for higher visibility. The higher visibility makes the luminance independent of the angle for displaying high-quality images.

The number of types of electrode pairs that are disposed in one pixel at different electrode pitches is two for each of dot A30, dot B31 that are alternately arranged in one direction, and remains the same with respect to all the dots. Since the aperture ratios of respective dots are constant, transmittance variations and response speed variations are reduced.

According to the present invention, therefore, there is provided a high-quality liquid crystal display device which is capable of preventing a moiré pattern from being produced due to the period of electrodes disposed in dots and the period of surface irregularities of a light reflecting film.

According to the present invention, furthermore, since the director directions of the liquid crystal molecules in one pixel are grouped into multiple domains, undesirable colorations are prevented from occurring.

The electrode pairs in one pixel may be available in two or more types. As the number of different electrodes increases, the number of domains in which the director directions of the liquid crystal molecules are different increases, resulting in a further reduction in colorations. The periodicity of the pixel electrodes is further distributed to blur any moiré patterns, which are made visually unrecognizable by the human eye. The quality of displayed images is thus increased.

According to the present invention, moreover, since the electrode pairs in each pixel are of a plurality of types, they can be designed with a high degree of freedom, can be designed in a reduced number of steps, and can be reduced in cost. Particularly, since high-definition display devices have a small dot size, the high degree of design freedom allows a large aperture ratio to be designed. As a result, a high-quality liquid crystal display device of high transmittance is provided.

Dots where parallel electrode pairs A, B are differently arrayed and combined may be two successive adjacent dots or three or more successive adjacent dots. Stated otherwise, dots where parallel electrode pairs A, B are identically arrayed and combined are not limited to every second dots, but may be every third dot or more.

Since the period of the array of pixel electrodes is thus increased, a moiré pattern is reduced in displayed images. Furthermore, because a diffraction due to light reflected by the electrodes is reduced because of an increased number of electrodes whose arrays have different periods, iridescent light is also reduced.

The advantages of the present exemplary embodiment have been described above. The liquid crystal display device according to the present invention has modifications and advantages as follows:

Dots A30, B31 that are arranged alternately may be arranged in a checkerboard pattern on the display surface. Since the checkerboard pattern reduces the periodicity of electrodes in the positive X-axis direction on each line, the uniformity of reflected light is increased for the display of high-quality images. If a dot-inverted drive scheme is applied, then since the difference between reflected lights from the dots is further reduced, high-quality images can be displayed effectively.

Local regions having electrode pairs which are different in shape than other electrode pairs may be provided in the same pixel to produce a plurality of distributions of electric field that are different from each other. Therefore, the pixel includes a plurality of regions where the directors of liquid crystals are different from each other, and since colorations in these regions cancel out each other, the viewing angle of the display device is increased.

In particular, it is more effective to provide electrode pairs for generating an electric field that mainly includes a vertical component. To generate an electric field that mainly includes a vertical component, it is preferable that the width of the electrodes or the gap between the common electrodes and the pixel electrodes be equal to or smaller than the gap between lower substrate 11 and upper substrate 12.

The electrode pairs in transmissive area 6 may be of the same shape and the same electrode pitch in all the dots. In this case, since the voltages applied to the liquid crystal molecules are uniform in the pixel, the V-T characteristic curve is free of variations, allowing the liquid crystal display device to display high-quality images in the transmissive display mode.

Other electrodes may be disposed on the surface of upper substrate 12 which faces liquid crystal layer 13. It is preferable that the potential of the other new electrodes be equal to the potential of the common electrodes.

Each of the dots may be assigned one R, G, B color by a color filter. In the present exemplary embodiment, the period of pixel electrodes of the same shape is represented by every other dot. If each pixel is colored in three colors of R, G, B, then adjacent pixels have differently arrayed and combined patterns of electrode pairs even if they have the same colors, making it possible to display high-quality images since they compensate for mutual coloring characteristics.

Each pixel may be colored in four or more colors, rather than the three colors. For example, W (white) pixels may be added to increase the luminance of the display surface as it is seen head-on.

Transmissive area 6 and reflective area 5 may have common electrodes 26 which have common periods. Since such common periods allow lines to be effectively wired in the boundary area between transmissive area 6 and reflective area 5, the aperture ratio may be increased for higher transmittance and reflectance.

In the liquid crystal display device according to the present exemplary embodiment, common electrodes 26 and pixel electrodes 27 are disposed in one electrode layer. Therefore, common electrodes 26 and pixel electrodes 27 can simultaneously be fabricated in one step, and hence the number of processing steps required is reduced leading to a lower cost.

The distribution of the electric field for driving the liquid crystal molecules may be different between transmissive area 6 and reflective area 5. Since the light reflected by reflective area 5 and the light transmitted through transmissive area 6 have different retardation values, the distribution of the electric field between the electrodes may be adjusted to equalize the retardation values.

The width, interval, and film thickness of the electrodes may be adjusted to adjust the distribution of the electric field generated between the electrodes. A dielectric material may be provided on or around the metal layer to adjust the distribution of the generated electric field to equalize the retardation values.

Pixel electrodes 27 in transmissive area 6 and pixel electrodes 27 in reflective area 5 may be made of different materials. In the present exemplary embodiment, the electrodes in transmissive area 6 are made of a transparent material of ITO, and the electrodes in reflective area 5 are made of a metal material of Cr. Therefore, the transmittance of transmissive area 6 is increased, and highly accurate patterning is possible in reflective area 5. The electrode materials are not limited to those described above. The electrodes in transmissive area 6 may be made of a transparent metal, and the electrodes in reflective area 5 may be made of an opaque metal.

Pixel electrodes 27 in transmissive area 6 and pixel electrodes 27 in reflective area 5 may be energized independently of each other. If they are energized independently of each other, then the γ characteristics of transmissive area 6 and reflective area 5 are individually determined with accuracy, allowing the liquid crystal display device to display high-quality images in both the transmissive display mode and the reflective display mode.

The electrode pairs may be made of a transparent metal. Since the transparent metal allows incident light from an external source to be transmitted and also allows reflected light from the surface-irregularity reflecting plate below the electrodes to be transmitted, the reflecting area of reflective area 5 can be substantially increased for an increased reflectance.

The electrode pairs may be made of an opaque metal for absorbing visible light. The liquid crystal molecules directly above the electrodes cannot be fully controlled because of the vertical electric field generated directly above the electrodes. Consequently, while the liquid crystal display device is displaying a black image, incident light from an external source enters the liquid crystal display device and is reflected by the electrodes, lowering the contrast in the reflective display mode. If the electrode pairs are made of an opaque metal for absorbing visible light, then the contrast in the reflective display mode is increased. The opaque metal may be provided as a light absorbing layer disposed on the metal layer.

The reflectance of the electrodes of horizontal-electric-field electrode 3 should desirably be lower than the reflectance of light reflecting film 2. The diffraction of light reflected by the electrodes is thus reduced for the display of high-quality images.

The layer above the electrodes may be made of a material permeable to light. In this case, since the electrodes may be used as a portion of the reflective area, the liquid crystal display device is capable of displaying high-quality images that are highly visible in the reflective display mode.

A light absorbing film may be disposed on the electrodes. The light absorbing film reduces the diffraction of light reflected by the electrodes for the display of high-quality images.

2nd Aspect of First Exemplary Embodiment

A liquid crystal display device according to a second aspect of the first exemplary embodiment of the present invention will be described below. The liquid crystal display device according to the second aspect of the first exemplary embodiment is the same as the liquid crystal display device according to the first aspect of the first exemplary embodiment except for the electrode structure in the pixels. Only those details of the liquid crystal display device according to the second aspect of the first exemplary embodiment which are different from those of the liquid crystal display device according to the first aspect of the first exemplary embodiment will be described below.

Figure 12:
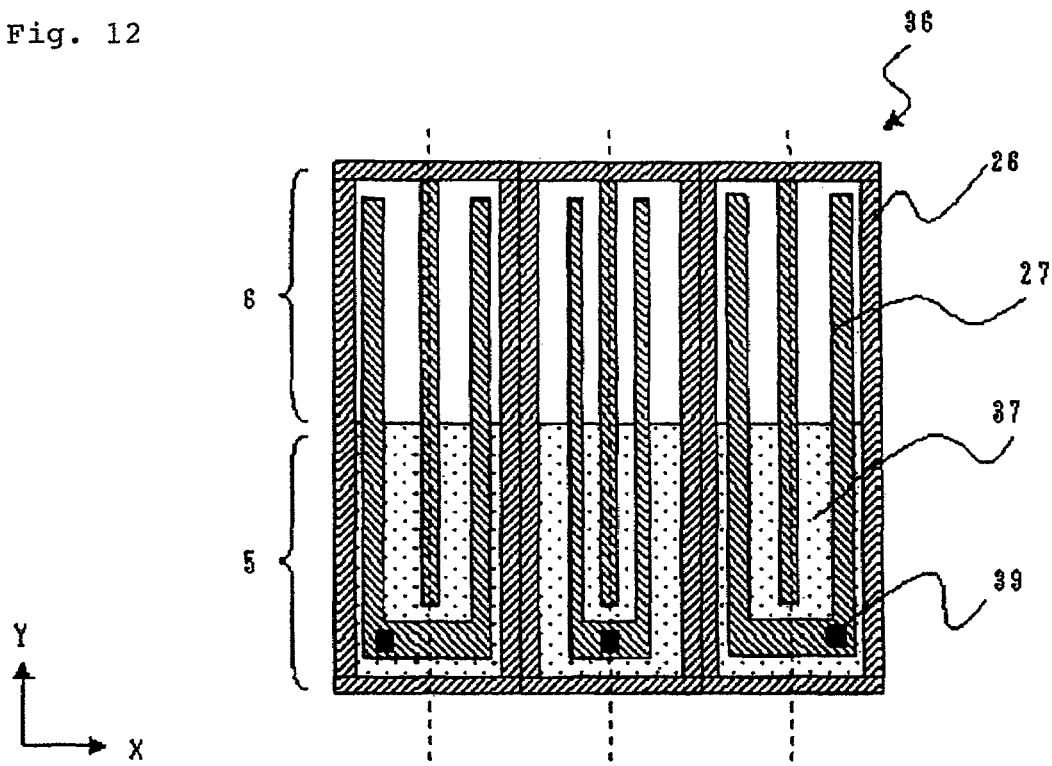
FIG. 12 is a plan view showing a pixel of a liquid crystal display device according to a second aspect of the first exemplary embodiment of the present invention.

FIG. 12 shows a plan view of a pixel of the liquid crystal display device according to the second aspect of the first exemplary embodiment. As shown in FIG. 12, the pixel includes different parallel electrode pairs A, B of two types. Electrode pairs A, B are alternately arrayed in the X-axis directions. Dot A including an electrode structure in which electrode pairs are arrayed in the sequence of A, B, B, A in the positive X-axis direction and dot B including an electrode structure in which electrode pairs are arrayed in the sequence of B, A, A, B in the positive X-axis direction, are alternately repeated in the pixel. Thus, the pixel has the same arrayed and combined pattern of the electrode pairs as with the first exemplary embodiment.

According to the present aspect, the electrode pitches in reflective area 5 and transmissive area 6 in the pixel are the same as each other. Specifically, common electrodes 26 and pixel electrodes 27, each of a combtoothed configuration, extend in both reflective area 5 and transmissive area 6, with the comb teeth being interdigitated. The other electrode structural details of the pixel except for the above structural details are the same as those of the first exemplary embodiment.

According to the present aspect, since the electrodes are constructed in a simple pattern, pattern image development irregularities are reduced for an increased yield. Pixel electrodes 27 in transmissive area 6 and reflective area 5 may have the same potential, and only one contact hole 39 may be present in each dot. Since it is not necessary to use different contact holes in transmissive area 6 and reflective area 5, the number of contact holes is reduced leading to a lower cost. Inasmuch as the electrode configuration is simplified, pattern image development irregularities are reduced for an increased yield.

3rd Aspect of First Exemplary Embodiment

A liquid crystal display device according to a third aspect of the first exemplary embodiment of the present invention will be described below. Only those details of the liquid crystal display device according to the third aspect of the first exemplary embodiment which are different from those of the liquid crystal display device according to the second aspect of the first exemplary embodiment will be described below.

Figure 13:
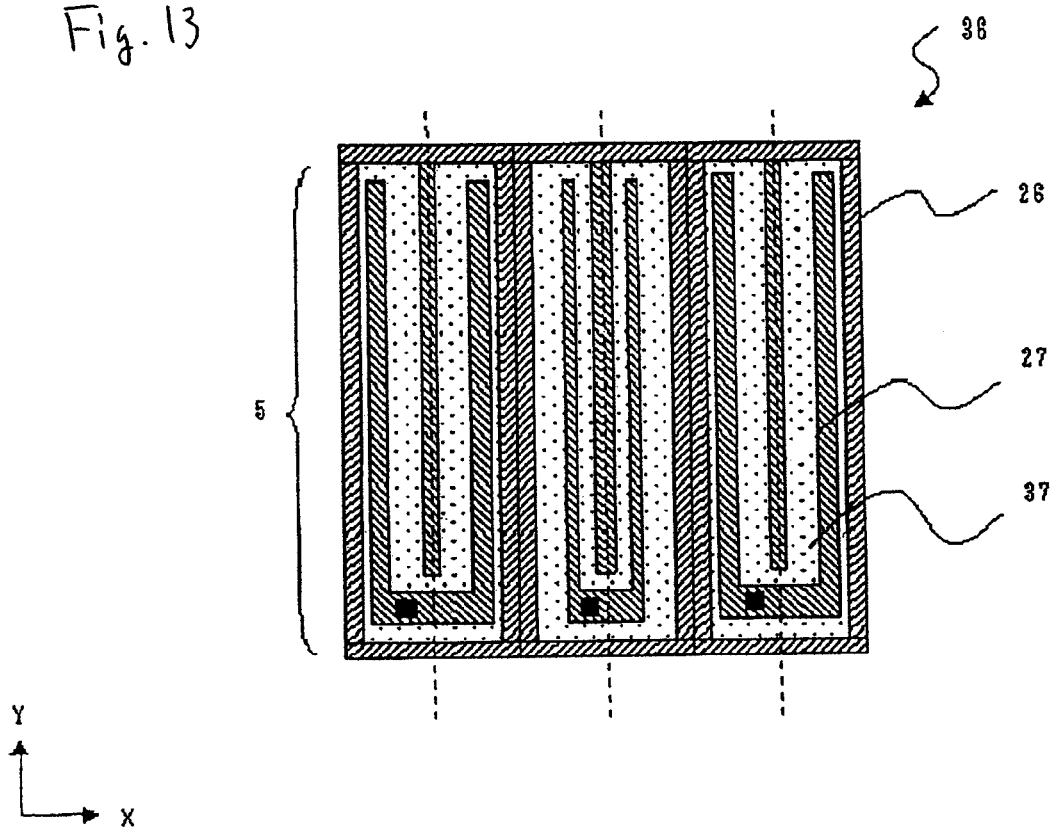
FIG. 13 is a plan view showing a pixel of a liquid crystal display device according to a third aspect of the first exemplary embodiment of the present invention.

FIG. 13 shows a plan view of a pixel of the liquid crystal display device according to the third aspect of the first exemplary embodiment. As shown in FIG. 13, the pixel has no transmissive area, but only has reflective area 5. Except for the above structure, the pixel has the same arrayed and combined pattern of electrode pairs as with the second aspect.

Since the structure according to the third aspect has a high reflectance, the liquid crystal display device according to the third aspect has high visibility in bright environments.

The electrode structure in the pixel may have one pixel electrode 27 extending axisymmetrically with respect to the longitudinal direction of the pixel. As the number of electrodes is reduced, the aperture ratio of the pixel is increased. The electrode structure with one pixel electrode is suitable for use in a high-definition display device.

1st Aspect of Second Exemplary Embodiment

A liquid crystal display device according to a first aspect of a second exemplary embodiment of the present invention will be described below. The liquid crystal display device according to the first aspect of the second exemplary embodiment is the same as the liquid crystal display device according to the first aspect of the first exemplary embodiment except for the electrode structure and the surface-irregularity reflecting plate in the pixels. Only those details of the liquid crystal display device according to the first aspect of the second exemplary embodiment which are different from those of the liquid crystal display device according to the first aspect of the first exemplary embodiment will be described below.

Figure 14:
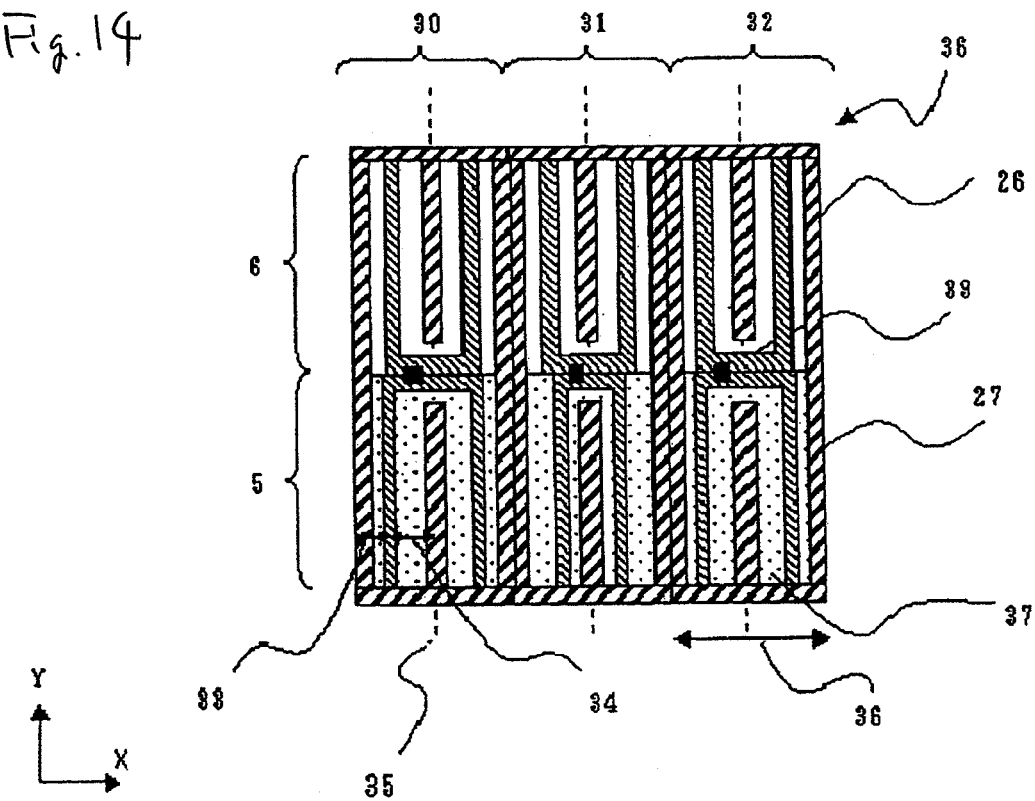
FIG. 14 is a plan view showing a pixel of a liquid crystal display device according to a first aspect of a second exemplary embodiment of the present invention.
Figure 15:
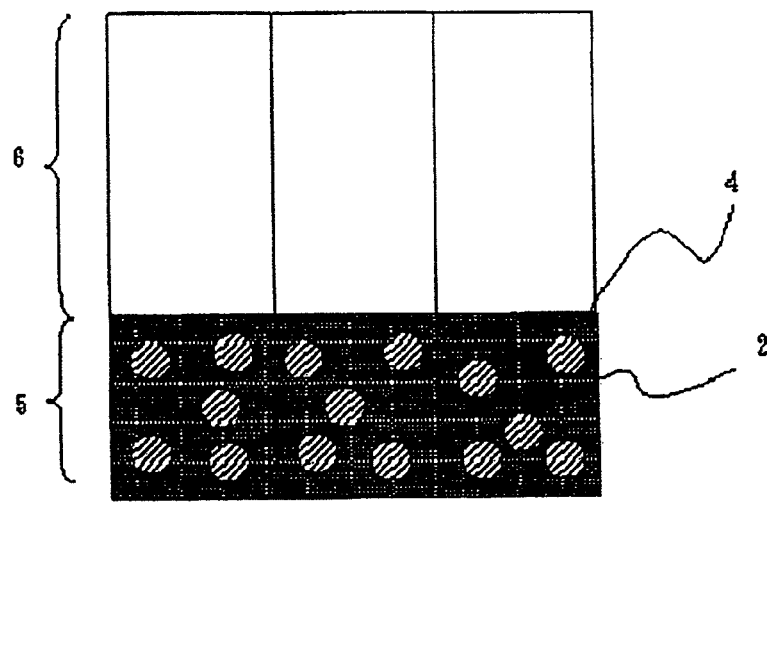
FIG. 15 is a plan view showing a reflecting place with surface irregularities of the liquid crystal display device according to the first aspect of the second exemplary embodiment of the present invention.

FIG. 14 shows a plan view of a pixel of the liquid crystal display device according to the first aspect of the second exemplary embodiment. FIG. 15 shows a plan view of the reflecting plate that has a surface-irregularity in the pixel.

According to the present aspect, as shown in FIG. 14, pixel electrodes 27 and common electrodes 26 are disposed in different layers of a laminated film on lower substrate 11 in both transmissive area 6 and reflective area 5. In the present exemplary embodiment, pixel electrodes 27 are made of ITO. An insulating film is disposed on pixel electrodes 27, and the layer of common electrodes 26 is disposed on the insulating film. Common electrodes 26 are made of Cr.

Except for the above structure, the liquid crystal display device according to the first aspect of the second exemplary embodiment is the same as the liquid crystal display device according to the first exemplary embodiment. In particular, the pixel has the same arrayed and combined pattern of the electrode pairs as with the first aspect of the first exemplary embodiment.

With pixel electrodes 27 and common electrodes 26 being made of different metals, the film thickness and resistance value of the metal layers may be adjusted to uniformize the distribution of the electric field generated by electrode pairs A34 and electrode pairs B34. Since the distribution of the electric field applied to the liquid crystal molecules can be uniformized, the reliability of the liquid crystal display device is increased, and response, after-image, and in-plane luminance variations are reduced.

A dielectric material may be provided on or around the metal layers to adjust the distribution of the generated electric field to uniformize the V-T characteristics.

As shown in FIG. 15, the coordinates of the apexes of convexities 4 in reflective area 5 may be randomly positioned in the pixel. Since the pixels are arranged in a matrix on the display surface, the reflecting surface-irregularity patterns of the pixels are periodically arranged.

Convexities 4 of the surface-irregularity film, that is a film having surface irregularities, are irregularity disposed in each dot, and such dots may be arranged in a matrix on the display surface. This structure can be easily designed because the dot size can be easily adjusted depending on the size of the pixel.

2nd Aspect of Second Exemplary Embodiment

A liquid crystal display device according to a second aspect of the second exemplary embodiment of the present invention will be described below. The liquid crystal display device according to the second aspect of the second exemplary embodiment is the same as the liquid crystal display device according to the first aspect of the first exemplary embodiment except for the electrode structure in the pixels. Only those details of the liquid crystal display device according to the second aspect of the second exemplary embodiment which are different from those of the liquid crystal display device according to the first aspect of the first exemplary embodiment will be described below.

Figure 16:
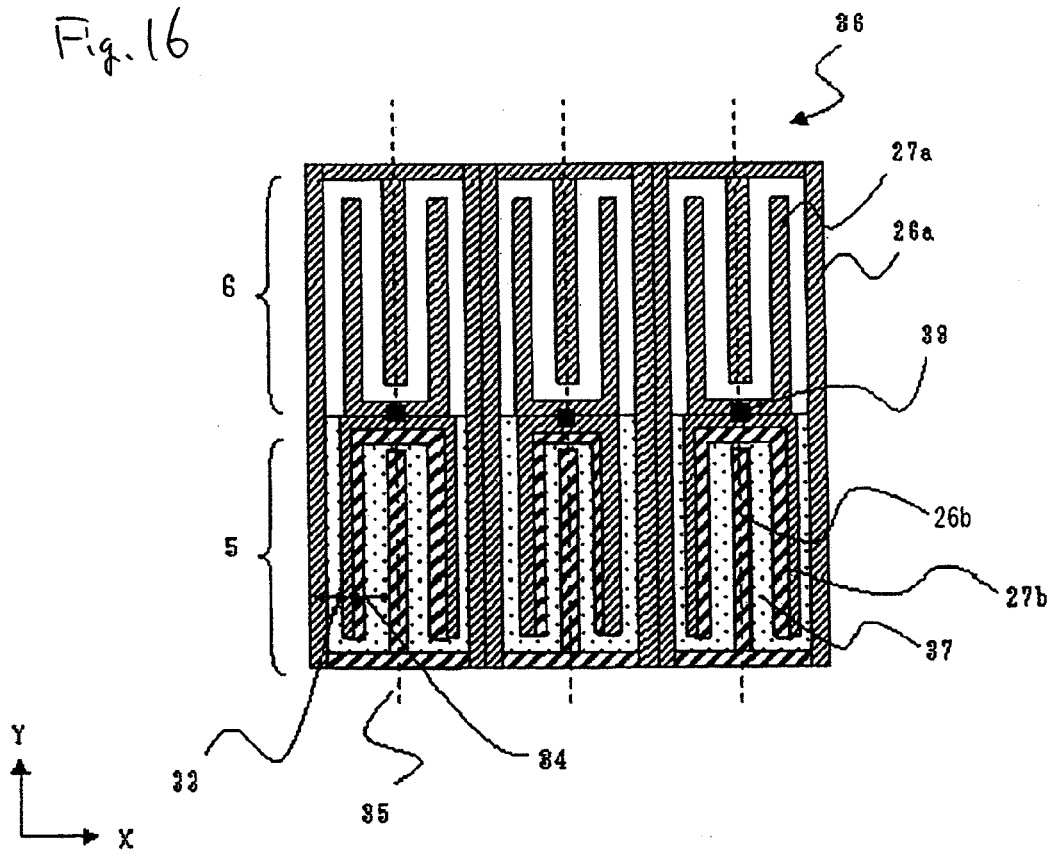
FIG. 16 is a plan view showing a pixel of a liquid crystal display device according to a second aspect of the second exemplary embodiment of the present invention.

FIG. 16 shows a plan view of a pixel of the liquid crystal display device according to the second aspect of the second exemplary embodiment.

As shown in FIG. 16, electrode pairs A33 and electrode pairs B34 are alternately arrayed in the X-axis directions. The pixel is divided into three dots. Dot A including an electrode structure in which electrode pairs are arrayed in the sequence of A, B, B, A in the positive X-axis direction and dot B including an electrode structure in which electrode pairs are arrayed in the sequence of B, A, A, B in the positive X-axis direction, are alternately repeated in the positive X-axis direction.

Specifically, in dot A, electrode pairs A33 are disposed at the ends of reflective area 5, and electrode pairs B34 are disposed at the center of reflective area 5. In dot B, electrode pairs A33 are disposed at the center of reflective area 5, and electrode pairs B34 are disposed at the ends of reflective area 5. The above arrayed and combined pattern of the electrode pairs is the same as with the first aspect of the first exemplary embodiment.

In the second aspect, electrode pairs A33 and electrode pairs B34 in reflective area 5 are made of different materials. In reflective area 5 of dot A, electrode pairs A33 are made of ITO, and electrode pairs B34 are made of Cr. In reflective area 5 of dot B, electrode pairs A33 are made of Cr, and electrode pairs B34 are made of ITO. An insulating layer is disposed on the layer of electrode pairs A33, and a layer including electrode pairs B34 is disposed on the insulating layer.

In transmissive area 6, both pixel electrodes 27a and common electrodes 26a are made of ITO, and hence can be fabricated in the same step as with electrode pairs B34. Contact holes 39 are defined in both electrode pairs A33 and electrode pairs B34.

Figure 18:
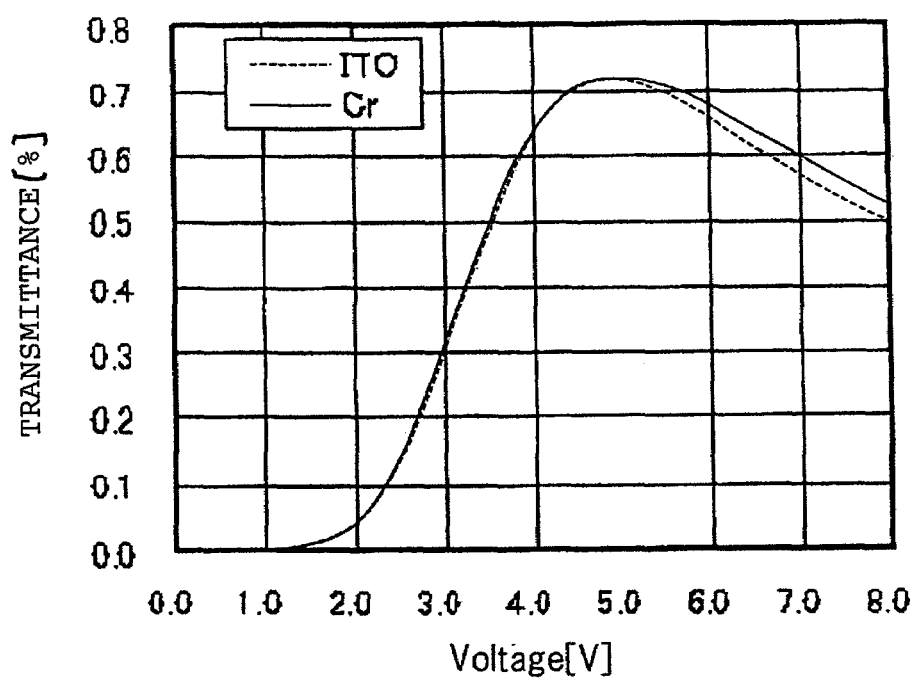
FIG. 18 is a graph showing transmittance-vs-voltage characteristics (V-T characteristics) according to the second and third aspects of the second exemplary embodiment of the present invention.

FIG. 18 shows transmittance-vs-voltage characteristics (V-T characteristics) of an electrode pair made of ITO and an electrode pair made of Cr. The electrode pair made of ITO is fabricated with an electrode width of 3 µm and an electrode interval of 6 µm, and the electrode pair made of Cr is fabricated with an electrode width of 2 µm and an electrode interval of 7 µm. FIG. 18 indicates that electrode pairs A33 and electrode pairs B34 which are made of different materials have similar V-T characteristics even though the electrode pitches vary.

According to the present aspect, since the V-T characteristics of electrode pairs A33 and electrode pairs B34 match each other with accuracy, luminance variations in the pixel are reduced.

3rd Aspect of Second Exemplary Embodiment

A liquid crystal display device according to a third aspect of the second exemplary embodiment of the present invention will be described below. The liquid crystal display device according to the third aspect of the second exemplary embodiment is the same as the liquid crystal display device according to the first aspect of the first exemplary embodiment except for the electrode structure in the pixels. Only those details of the liquid crystal display device according to the third aspect of the second exemplary embodiment which are different from those of the liquid crystal display device according to the first aspect of the first exemplary embodiment will be described below.

Figure 17:
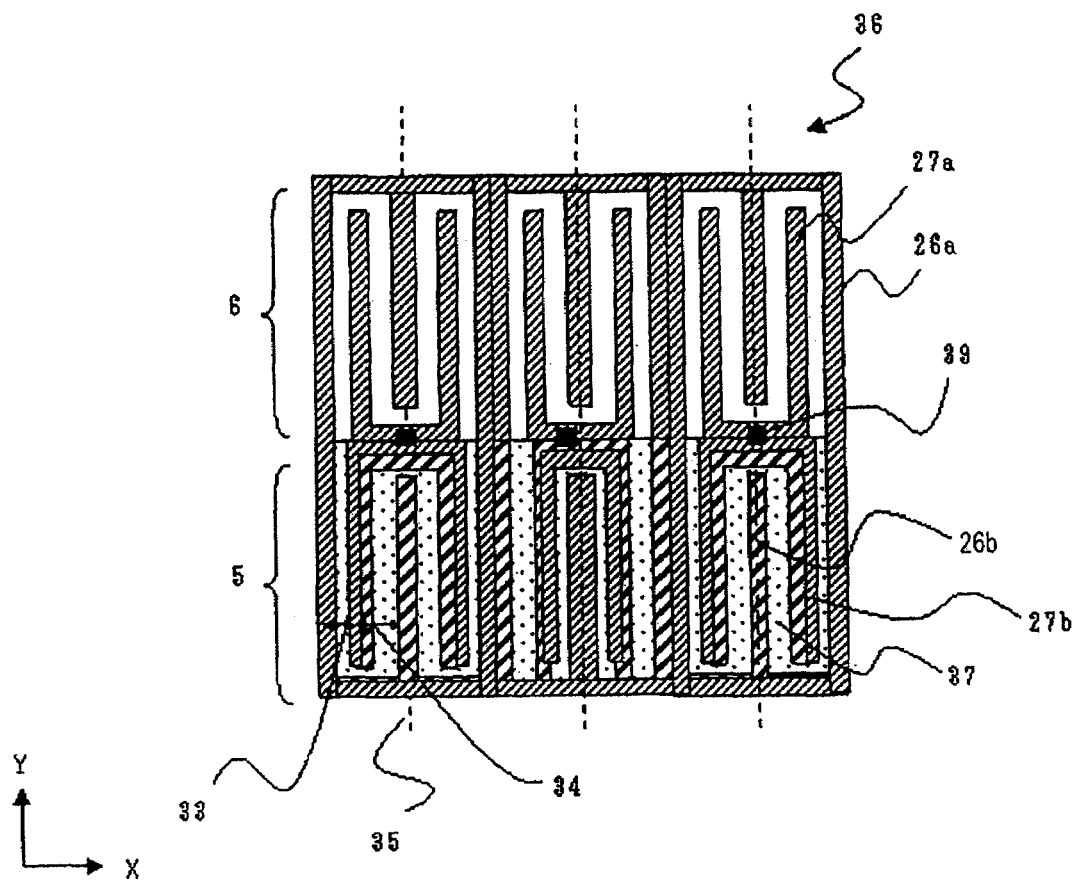
FIG. 17 is a plan view showing a pixel of a liquid crystal display device according to a third aspect of the second exemplary embodiment of the present invention.

FIG. 17 shows a plan view of a pixel of the liquid crystal display device according to the third aspect of the second exemplary embodiment.

As shown in FIG. 17, electrode pairs A33 and electrode pairs B34 have the same arrayed and combined pattern as with the first aspect of the first exemplary embodiment. Electrode pairs A33 and electrode pairs B34 in reflective area are made of different materials.

In the second aspect, electrode pairs A33 are made of ITO, and electrode pairs B34 are made of Cr. An insulating layer is disposed on the electrode layer of Cr, and a layer including the electrodes of ITO is disposed on the insulating layer.

In transmissive area 6, both pixel electrodes 27a and common electrodes 26a are made of ITO, and hence can be fabricated in the same step as with electrodes made of ITO in reflective area 5. Contact holes 39 are defined in both electrode pairs A33 and electrode pairs B34. The other structural details except for the above structural details are the same as those of the first aspect of the first exemplary embodiment.

As shown in FIG. 18, electrode pairs A33 and electrode pairs B34 in reflective area 5 which are made of different materials have substantially the same V-T characteristics. The electrode pair made of ITO is fabricated with an electrode width of 3 µm and an electrode interval of 6 µm, and the electrode pair made of Cr is fabricated with an electrode width of 2 µm and an electrode interval of 7 µm.

A comparison between FIGS. 11 and 18 shows that the V-T characteristics of electrode pairs A33 and electrode pairs B34 according to the second aspect match each other more accurately than those of electrode pairs A33 and electrode pairs B34 which are made of ITO. According to the second aspect, therefore, luminance variations in the display surface are reduced.

4th Aspect of Second Exemplary Embodiment

A liquid crystal display device according to a fourth aspect of the second exemplary embodiment of the present invention will be described below. The liquid crystal display device according to the fourth aspect of the second exemplary embodiment is the same as the liquid crystal display device according to the first aspect of the first exemplary embodiment except for the electrode structure in the pixels. Only those details of the liquid crystal display device according to the fourth aspect of the second exemplary embodiment which are different from those of the liquid crystal display device according to the first aspect of the first exemplary embodiment will be described below.

Figure 19:
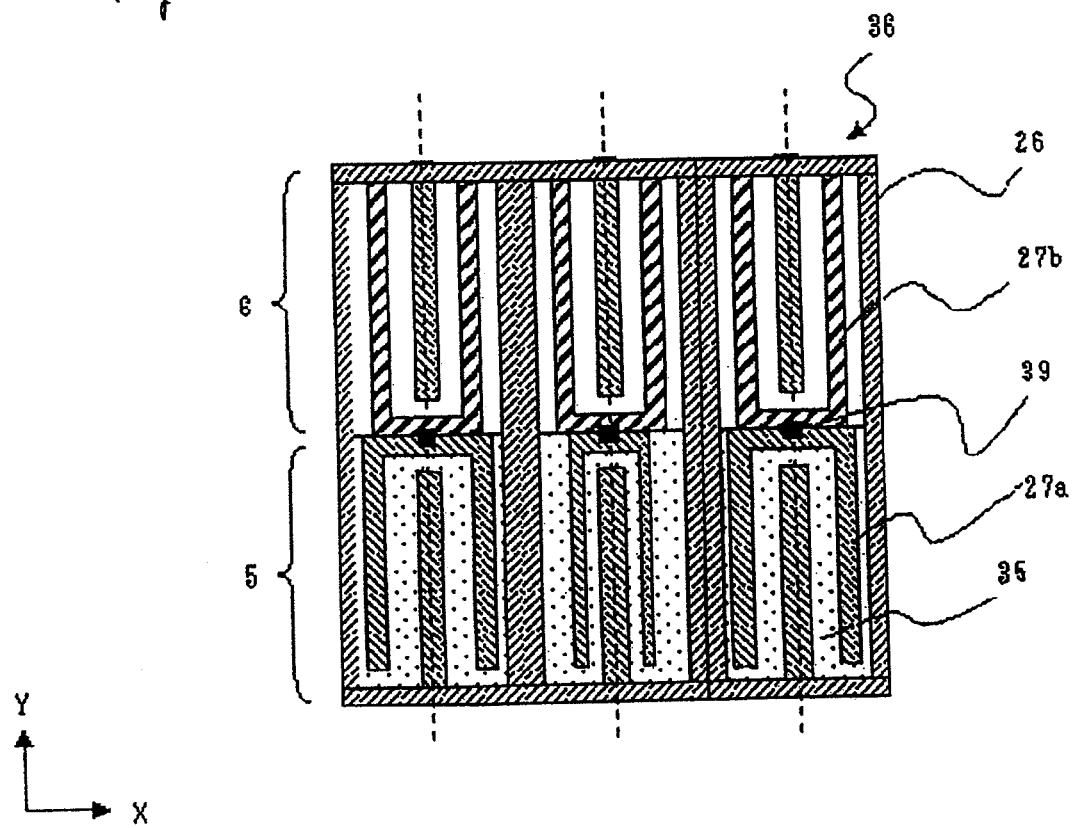
FIG. 19 is a plan view showing a pixel of a liquid crystal display device according to a fourth aspect of the second exemplary embodiment of the present invention.

FIG. 19 shows a plan view of the liquid crystal display device according to the fourth aspect of the second exemplary embodiment. As shown in FIG. 19, all electrodes disposed in reflective area 5 are disposed in the same layer. Pixel electrodes 27b and common electrodes 26 in transmissive area 6 are disposed in respective different layers on lower substrate 11.

In transmissive area 6, pixel electrodes 27b comprise transparent electrodes, and common electrodes 26 are made of Cr. In reflective area 5, both pixel electrodes 27b and common electrodes 26 are made of Cr. Since pixel electrodes 27b are permeable to light in transmissive area 6, the transmittance of transmissive area 6 is increased.

In reflective area 5, the electrodes can be processed to small dimensions.

With common electrodes 26 being disposed in the layer on lower substrate 11, both transmissive area 6 and reflective area 5 can be simultaneously fabricated for a lower cost.

1st Aspect of Third Exemplary Embodiment

In the liquid crystal display devices according to the first and second exemplary embodiments described above, the electrode structure in each of the dots of each of the pixels is axisymmetrical with respect to the central line of the dot, and the pixels have a constant aperture ratio. In liquid crystal display devices to be described below, the electrode structure in each of the dots of each of the pixels is axiasymmetrical with respect to the central line of the dot, and the pixels have a constant aperture ratio.

A liquid crystal display device according to a first aspect of a third exemplary embodiment of the present invention will be described below. The liquid crystal display device according to the first aspect of the third exemplary embodiment is the same as the liquid crystal display device according to the first aspect of the first exemplary embodiment except for the electrode structure in the pixels. Only those details of the liquid crystal display device according to the first aspect of the third exemplary embodiment which are different from those of the liquid crystal display device according to the first aspect of the first exemplary embodiment will be described below.

Figure 20:
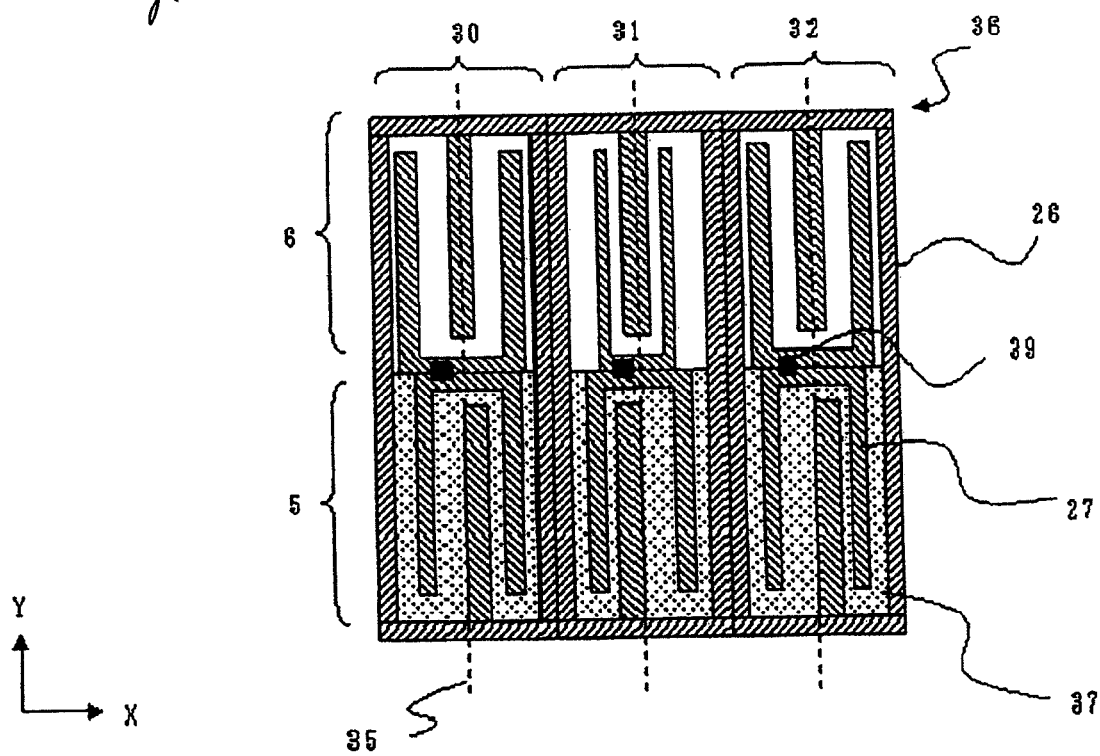
FIG. 20 is a plan view showing a pixel of a liquid crystal display device according to a first aspect of a third exemplary embodiment of the present invention.

FIG. 20 shows a plan view of a pixel of the liquid crystal display device according to the first aspect of the third exemplary embodiment. As shown in FIG. 20, the electrode structure in reflective area 5 of a pixel comprises two different types of electrode pairs (electrode pairs A, B). Electrode pairs A, B have different electrode pitches. In the present exemplary embodiment, the electrode structure in transmissive area 6 also comprises two different types of electrode pairs. However, the electrode structure in transmissive area 6 may be of the same as with the first exemplary embodiment.

In reflective area 5, electrode pairs A, B in dots 30, 31, 32 are asymmetrical with respect to the central lines of the dots. Therefore, the electrodes in reflective area 5 of the pixel show no periodic structure. Otherwise, the structural details are the same as those of the first aspect of the first exemplary embodiment.

According to the second aspect, since the number of electrode pairs remains the same in the pixels, the pixels have a constant aperture ratio. Therefore, luminance variations in the pixel are reduced for increased displayed image quality.

In the present exemplary embodiment, the number of electrode pairs is not limited to two, but each of the pixels may include three or more types of electrode pairs. With three or more types of electrode pairs, the number of domains in which the director directions of the liquid crystal molecules are different increases, resulting in a reduction in colorations.

Pixel electrodes 27 may be positionally different in dots to eliminate the periodicity of pixel electrodes 27 against the periodic array of dots. Since no periodic electrode structure is present, a moiré pattern due to the periodic nature of surface irregularities is reduced.

2nd Aspect of Third Exemplary Embodiment

A liquid crystal display device according to a second aspect of the third exemplary embodiment of the present invention will be described below. The liquid crystal display device according to the second aspect of the third exemplary embodiment is the same as the liquid crystal display device according to the first aspect of the first exemplary embodiment except for the electrode structure in the pixels. Only those details of the liquid crystal display device according to the second aspect of the third exemplary embodiment which are different from those of the liquid crystal display device according to the first aspect of the first exemplary embodiment will be described below.

FIGS. 21(a) through 21(c) show a plan view of pixels of the liquid crystal display device according to the second aspect of the third exemplary embodiment. As shown in FIGS. 21(a) through 21(c), a pixel is divided into three dots 30, 31, 32 arrayed in the X-axis directions, and pixel electrodes 27 in transmissive area 6 and reflective area 5 are disposed off the central lines of the respective dots. As shown in FIGS. 21(a) through 21(c), pixel electrodes 27 may be located in any arbitrary positions in the respective dots.

Each of the dots includes pixel electrodes 27 and common electrodes 26 as two types of parallel electrode pairs. The two types of electrode pairs are asymmetrical with respect to the central lines of the dots.

In other words, in both transmissive area 6 and reflective area 5, the electrodes have no periodic structure. Otherwise, the structural details are the same as those of the first aspect of the first exemplary embodiment.

According to the second aspect, the number of pixel electrodes in the pixel is reduced to increase the aperture ratio of the pixel. Since the size of pixels of a high-definition display device is reduced, the number of electrodes that can be placed in each of the pixels is limited.

With the electrode structure according to the second aspect being applied to the liquid crystal display device, the aperture ratio of the pixel is increased to display images brightly.

1st Aspect of Fourth Exemplary Embodiment

A liquid crystal display device according to a first aspect of a fourth exemplary embodiment of the present invention will be described below. The liquid crystal display device according to the first aspect of the fourth exemplary embodiment is the same as the liquid crystal display device according to the first aspect of the first exemplary embodiment except for the electrode structure in the pixels. Only those details of the liquid crystal display device according to the first aspect of the fourth exemplary embodiment which are different from those of the liquid crystal display device according to the first aspect of the first exemplary embodiment will be described below.

FIG. 22 shows a plan view of a pixel of the liquid crystal display device according to the first aspect of the fourth exemplary embodiment. As shown in FIG. 22, a pixel is divided into three dots 30, 31, 32 arrayed in the X-axis directions, and each of dots 30, 31, 32 is bent at the boundary between reflective area 5 and transmissive area 6. Stated otherwise, all dots 30, 31, 32 are chevron-shaped.

In each of the dots, single pixel electrode 27 is disposed in a position off the central axis between common electrodes 27.

Each of the dots includes pixel electrode 27 and common electrodes 26 as two types of parallel electrode pairs. The two types of electrode pairs are asymmetrical with respect to the central lines of the dots. Otherwise, the structural details are the same as those of the first aspect of the first exemplary embodiment.

According to the first aspect, since each of the dots is chevron-shaped, there are more areas in which the liquid crystal molecules are oriented in different directions. Therefore, the liquid crystal display device suffers less colorations and displays high-quality images.

While various exemplary embodiments of the present invention have been described above, the present invention is not limited to the above exemplary embodiments, but changes and variations may be made without departing from the spirit or scope of the invention.

Figure 23:
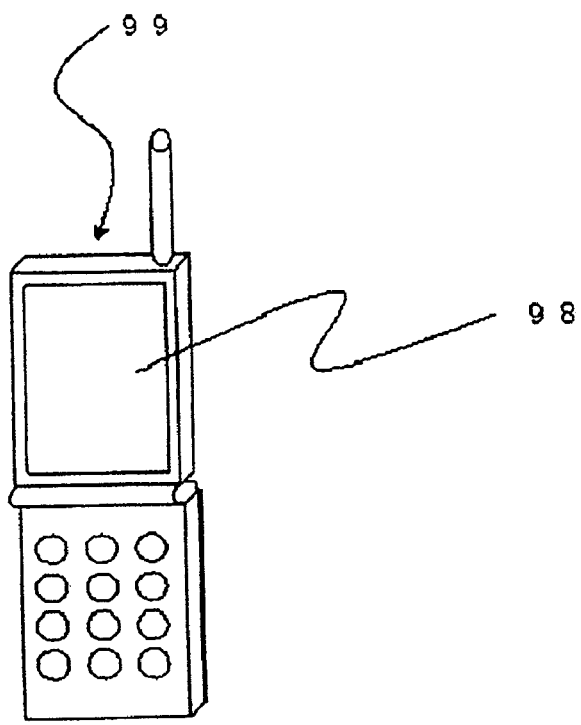
FIG. 23 is a perspective view of a cellular phone incorporating a display device according to the present invention.
Figure 24:
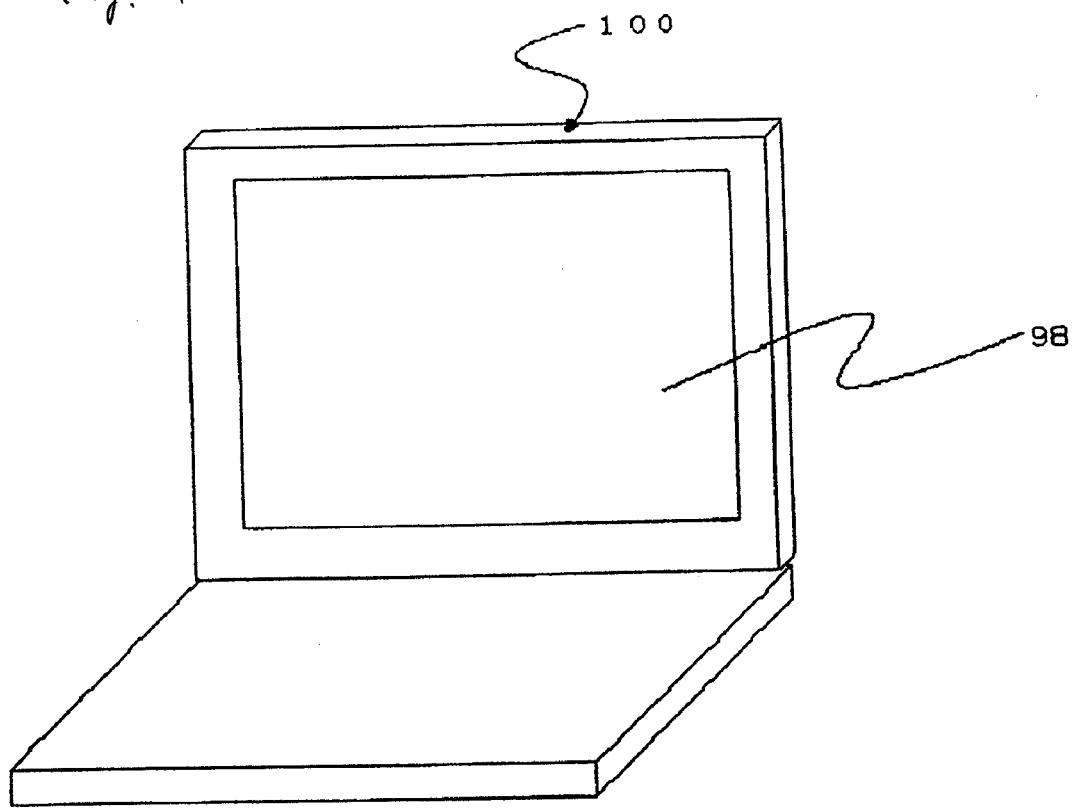
FIG. 24 is a perspective view of a notebook PC incorporating a display device according to the present invention.

The principles of the present invention may be applied to liquid crystal display device 98 of cellular phone 99 shown in FIG. 23 or to liquid crystal display device 98 of notebook PC 100 shown in FIG. 24.

Furthermore, the principles of the present invention are also applicable to a liquid crystal display device for use in a PDA, a game machine, a digital camera, a video camera, a video player, or the like, and to a liquid crystal display device for use in a terminal device such as a cash dispenser, an automatic vending machine, or the like.

While preferred embodiments of the present invention have been described using specific terms, such description is for illustrative purposes only, and it is to be understood that changes and variations may be made without departing from the spirit or scope of the following claims.

What is claimed is:

1. A liquid crystal display device comprising a plurality of pixels arrayed in a first direction and a second direction, each of the pixels having a reflective area in at least a portion thereof, wherein said reflective area comprises a surface-irregularity film that is a film having a plurality of surface irregularities, a light reflecting film disposed as an upper layer over the surface-irregularity film, and a group of electrode-pattern pairs for generating an electric field to drive liquid crystal, which is disposed as an upper layer over the light reflecting film and is arranged in a plane parallel to substrates sandwiching the liquid crystal molecules therebetween, and wherein said group of electrode-pattern pairs comprises at least two types of electrode-pattern pairs having different electrode intervals, in said reflective area in each of the pixels that are arrayed in at least the first direction, said at least two types of electrode-pattern pairs exist and are arrayed in said first direction, and combinations of said at least two types of electrode-pattern pairs in each of the pixels are the same, whereas permutations of said at least two types of electrode-pattern pairs in each of the pixels are periodically changed with respect to each of the pixels that are arrayed in said first direction.

2. The liquid crystal display device according to claim 1, wherein each of said at least two types of electrode-pattern pairs comprises an electrode pair including two electrodes extending in said second direction, and electrode pitches in said first direction of the electrode pair, of respective electrode-pattern pairs that correspond between adjacent pixels in said first direction, are different from each other.

3. The liquid crystal display device according to claim 2, wherein the same electrode pair is axisymmetrically disposed with respect to the central axis of the pixel which is parallel to a longitudinal direction of the pixel.

4. The liquid crystal display device according to claim 2, wherein the number of said electrode-pattern pairs disposed in the respective pixels are the same.

5. The liquid crystal display device according to claim 1, wherein each of said electrode-pattern pairs comprises a common electrode and a pixel electrode which extend parallel to each other to generate an electric field to drive liquid crystal molecules in a plane parallel to substrates sandwiching the liquid crystal molecules therebetween.

6. The liquid crystal display device according to claim 1, wherein said light reflecting film is made of electrically conductive metal.

7. A terminal device incorporating a liquid crystal display device according to claim 1.

8. The terminal device according to claim 7, which comprises a cellular phone, a personal information terminal, a game machine, a digital camera, a video camera, a video player, a notebook PC, a cash dispenser, or an automatic vending machine.

* * * * *